US012073771B2

(12) United States Patent
Hu et al.

(10) Patent No.: US 12,073,771 B2
(45) Date of Patent: Aug. 27, 2024

(54) DISPLAY PANEL AND DRIVING METHOD THEREOF, AND DISPLAY DEVICE

(71) Applicants: BOE MLED Technology Co., Ltd., Beijing (CN); BOE Technology Group Co., Ltd., Chaoyang District (CN)

(72) Inventors: Guofeng Hu, Beijing (CN); Qibing Gu, Beijing (CN); Lingyun Shi, Beijing (CN); Ming Chen, Beijing (CN); Xiurong Wang, Beijing (CN); Wei Hao, Beijing (CN); Tao Yang, Beijing (CN); Hong Liu, Beijing (CN); Mingjian Yu, Beijing (CN); Donghui Wang, Beijing (CN); Jing Xue, Beijing (CN); Yong Zhang, Beijing (CN); Jian Wang, Beijing (CN); Jian Lin, Beijing (CN); Xianglei Qin, Beijing (CN); Zhichao Yang, Beijing (CN); Zepeng Sun, Beijing (CN); Honggui Jin, Beijing (CN); Yashuai An, Beijing (CN); Zhilong Duan, Beijing (CN); Lingfang Nie, Beijing (CN); Liangzhen Tang, Beijing (CN); Limin Zhang, Beijing (CN)

(73) Assignees: BOE MLED Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 172 days.

(21) Appl. No.: 17/290,414

(22) PCT Filed: Sep. 18, 2020

(86) PCT No.: PCT/CN2020/116187

§ 371 (c)(1),
(2) Date: Apr. 30, 2021

(87) PCT Pub. No.: WO2021/082793

PCT Pub. Date: May 6, 2021

(65) Prior Publication Data

US 2022/0309997 A1 Sep. 29, 2022

(30) Foreign Application Priority Data

Oct. 31, 2019 (CN) ......................... 201911052865.1

(51) Int. Cl.
*G09G 3/32* (2016.01)
*G09G 3/34* (2006.01)

(52) U.S. Cl.
CPC ............. *G09G 3/32* (2013.01); *G09G 3/3426* (2013.01); *G09G 2300/0426* (2013.01);
(Continued)

(58) Field of Classification Search
CPC ... G09G 3/32–3291; G09G 3/34–3426; G09G 2300/02; G09G 2300/04–0408;
(Continued)

(56) References Cited

U.S. PATENT DOCUMENTS 6,326,942 B1 * 12/2001 Akimoto ................ G09G 3/002 345/98
7,400,097 B2 7/2008 Maede et al.
(Continued)

FOREIGN PATENT DOCUMENTS

CN 1716366 A 1/2006
CN 1930601 A 3/2007
(Continued)

OTHER PUBLICATIONS

Aug. 23, 2021—(CN) First Office Action Appn 201911052865.1 with English Translation.

*Primary Examiner* — Nathan Danielsen
(74) *Attorney, Agent, or Firm* — Banner & Witcoff, Ltd.

(57) ABSTRACT

A display panel and a driving method thereof, and a display device. The display panel includes a substrate and a plurality of pixel circuits arranged in an array on the substrate, each of the plurality of pixel circuits includes a pixel driving chip and at least one light-emitting element electrically connected
(Continued)

to the pixel driving chip, and the pixel driving chip is configured to receive and store a data signal and drive the at least one light-emitting element to emit light according to the data signal.

17 Claims, 14 Drawing Sheets

(52) U.S. Cl.
CPC . *G09G 2310/0286* (2013.01); *G09G 2310/08* (2013.01); *G09G 2330/021* (2013.01)

(58) Field of Classification Search
CPC ... G09G 2300/0426; G09G 2300/0842; G09G 2300/0847; G09G 2300/0857; G09G 2310/0221; G09G 2310/0243; G09G 2310/0286; G09G 2310/08; G09G 2320/0233; G09G 2320/0242; G09G 2320/066; G09G 2320/0666; G09G 2320/0686; G09G 2330/021; G09G 2380/02
See application file for complete search history.

(56) References Cited

U.S. PATENT DOCUMENTS

| | | | | |
|---|---|---|---|---|
| 8,547,300 | B2 | 10/2013 | Kwak et al. | |
| 9,336,704 | B2 | 5/2016 | Li et al. | |
| 9,812,083 | B2 | 11/2017 | Yen et al. | |
| 9,959,815 | B2 | 5/2018 | Sakariya et al. | |
| 10,573,227 | B2 | 2/2020 | Gu et al. | |
| 10,650,737 | B2 | 5/2020 | Vahid Far et al. | |
| 2005/0104818 | A1* | 5/2005 | Kwak | G09G 3/3233 345/76 |
| 2010/0039454 | A1* | 2/2010 | Nakamura | G09G 3/3233 345/690 |
| 2014/0139510 | A1* | 5/2014 | Han | G09G 3/3233 345/82 |
| 2014/0168036 | A1 | 6/2014 | Kubota et al. | |
| 2016/0099262 | A1* | 4/2016 | Lin | G09G 3/32 257/43 |
| 2017/0033171 | A1* | 2/2017 | Kim | G09G 3/3233 |
| 2017/0061867 | A1* | 3/2017 | Cok | G09G 3/2022 |

FOREIGN PATENT DOCUMENTS

| | | | |
|---|---|---|---|
| CN | 102456315 | A | 5/2012 |
| CN | 103325814 | A | 9/2013 |
| CN | 104134421 | A | 11/2014 |
| CN | 104218135 | A | 12/2014 |
| CN | 104252839 | A | 12/2014 |
| CN | 104919900 | A | 9/2015 |
| CN | 108511431 | A | 9/2018 |
| KR | 20060129458 | A | 12/2006 |
| WO | 2017053477 | A1 | 3/2017 |

* cited by examiner

DISPLAY PANEL AND DRIVING METHOD THEREOF, AND DISPLAY DEVICE

CROSS-REFERENCE TO RELATED APPLICATION

The application is a U.S. National Phase Entry of International Application PCT/CN2020/116187 filed on Sep. 18, 2020, designating the United States of America and claiming priority to Chinese Patent Application No. 201911052865.1, filed on Oct. 31, 2019. The present application claims priority to and the benefit of the above-identified applications and the above-identified applications are incorporated by reference herein in their entirety.

TECHNICAL FIELD

The embodiments of the present disclosure relate to a display panel and a driving method thereof, and a display device.

BACKGROUND

Mini LED (Mini Light-emitting Diode), also known as “sub-millimeter light-emitting diode”, refers to an LED with a grain size of about 100 microns or less. The grain size of the Mini LED is between a size of a traditional LED and a size of a Micro LED (micro light-emitting diode), simply put, the Mini LED is an improved version based on traditional LED backlight.

In terms of manufacturing process, compared with the Micro LED, the Mini LED has the advantages of high yield and special-shaped cutting characteristics. The Mini LED with a flexible substrate can also achieve a high-curved backlight display mode, and then adopt a local dimming design, which can have better color rendering (refers to the evaluation of the quality of the visual effect of the color when the light source illuminates the object), in a case where the Mini LED is used as a backlight light source of a liquid crystal panel, the Mini LED can bring more fine HDR partitions of the liquid crystal panel, and the thickness is also close to OLED (organic light-emitting display), the Mini LED can save up to 80% of power, and therefore, with the demands of power saving, thinness, HDR, special-shaped displays, and other backlight applications, the Mini LED is widely used in products such as mobile phones, televisions, car panels, and gaming laptops.

SUMMARY

At least one embodiment of the present disclosure provides a display panel, comprising: a substrate and a plurality of pixel circuits arranged in an array on the substrate; each of the plurality of pixel circuits comprises a pixel driving chip and at least one light-emitting element electrically connected to the pixel driving chip, and the pixel driving chip is configured to receive and store a data signal and drive the at least one light-emitting element to emit light according to the data signal.

For example, in the display panel provided by at least one embodiment of the present disclosure, each of the at least one light-emitting element comprises a first electrode and a second electrode; the pixel driving chip comprises a first terminal, a second terminal, and a third terminal, and is configured to control a current flowing through the at least one light-emitting element according to the data signal; and the first terminal of the pixel driving chip is connected to a first voltage terminal to receive a first voltage, and the second terminal of the pixel driving chip is connected to the first electrode of the at least one light-emitting element.

For example, the display panel provided by at least one embodiment of the present disclosure, further comprises: a gate driving circuit, a plurality of gate lines, a data driving circuit, and a plurality of data lines, which are on the substrate; the pixel circuit comprises a data writing circuit, and the data writing circuit is connected to the pixel driving chip and configured to write the data signal to the pixel driving chip in response to a scan signal; the gate driving circuit is electrically connected to data writing circuits of a plurality of rows of pixel circuits through the plurality of gate lines, respectively, and is configured to provide a plurality of scan signals to the data writing circuits of the plurality of rows of pixel circuits, respectively; and the data driving circuit is electrically connected to data writing circuits of a plurality of columns of pixel circuits through the plurality of data lines, respectively, and is configured to provide a plurality of data signals to the data writing circuits of the plurality of columns of pixel circuits, respectively.

For example, in the display panel provided by at least one embodiment of the present disclosure, the data writing circuit comprises a data writing transistor; a gate electrode of the data writing transistor is electrically connected to the gate driving circuit through a gate line connected to the data writing transistor to receive the scan signal, a first electrode of the data writing transistor is electrically connected to the data driving circuit through a data line connected to the data writing transistor to receive the data signal, and a second electrode of the data writing transistor is electrically connected to the third terminal of the pixel driving chip.

For example, in the display panel provided by at least one embodiment of the present disclosure, the pixel driving chip comprises one second terminal, and the second terminal is electrically connected to the first electrode of the at least one light-emitting element, or, the at least one light-emitting element comprises a plurality of light-emitting elements, the pixel driving chip comprises a plurality of second terminals, and the plurality of second terminals are electrically connected to first electrodes of the plurality of light-emitting elements in a one-to-one correspondence manner.

For example, in the display panel provided by at least one embodiment of the present disclosure, second electrodes of light-emitting elements of pixel circuits in each row are connected to a same second voltage line to receive a second voltage.

For example, the display panel provided by at least one embodiment of the present disclosure, further comprises: a plurality of groups of second voltage lines; the plurality of groups of second voltage lines are connected to a plurality rows of pixel circuits in a one-to-one correspondence manner; the plurality of light-emitting elements comprise Q light-emitting elements, each group of second voltage lines comprises Q second voltage lines, and a q-th second voltage line of the Q second voltage lines is connected to q-th light-emitting elements respectively electrically connected to respective pixel driving chips of pixel circuits in a corresponding row, q is an integer greater than 0 and less than or equal to Q, and Q is an integer greater than or equal to 1.

For example, the display panel provided by at least one embodiment of the present disclosure, further comprises: a voltage control circuit, connected to the plurality of groups of second voltage line, and configured to sequentially apply second voltages to the Q second voltage lines in each group of second voltage lines according to a timing sequence of applying currents, which correspond to corresponding data signals, to the Q light-emitting elements, which are connected to the respective pixel driving chips, by the respective pixel driving chips, to drive the Q light-emitting elements to sequentially emit light according to the corresponding data signals.

For example, in the display panel provided by at least one embodiment of the present disclosure, the at least one light-emitting element comprises at least two light-emitting elements, and the at least two light-emitting elements emit light of different colors.

For example, in the display panel provided by at least one embodiment of the present disclosure, the at least one light-emitting-element is a sub-millimeter light-emitting diode or a miniature light-emitting diode.

For example, the display panel provided by at least one embodiment of the present disclosure, further comprises: a wiring electrode, on a side of the data writing transistor away from the substrate; and a second voltage line, in a same layer as the wiring electrode, and connected to the second electrode of the at least one light-emitting element to provide a second voltage; the at least one light-emitting element and the pixel driving chip are bound on a side of the wiring electrode away from the substrate, and the first electrode of the at least one light-emitting element is connected to the second terminal of the pixel driving chip through the wiring electrode.

For example, the display panel provided by at least one embodiment of the present disclosure, further comprises: a connection electrode; the connection electrode is connected to the wiring electrode through a hole, and the connection electrode is in a same layer as the first electrode and the second electrode of a thin film transistor.

For example, the display panel provided by at least one embodiment of the present disclosure, further comprises: a light shielding layer; the light shielding layer and the wiring electrode are arranged in a same layer, and an orthographic projection of the light shielding layer on the substrate coincides with an orthographic projection of the thin film transistor on the substrate.

At least one embodiment of the present disclosure further provides a display device, which comprises the display panel provided by any embodiment of the present disclosure.

At least one embodiment of the present disclosure further provides a display device, comprising a display panel and a backlight unit; the backlight unit comprises a plurality of backlight partitions and is driven by a local dimming method, and at least one of the plurality of backlight partitions comprises a pixel driving chip and at least one light-emitting element; and the pixel driving chip is configured to receive and store a data signal and drive the at least one light-emitting element to emit light according to the data signal.

At least one embodiment of the present disclosure further provides a driving method of the display panel provided by any embodiment of the present disclosure, comprising: writing a plurality of data signals into pixel driving chips in the plurality of pixel circuits arranged in the array, respectively; and by the pixel driving chips in the plurality of pixel circuits, driving the at least one light-emitting element in each pixel circuit of the plurality of pixel circuits to emit light according to the data signals, respectively.

For example, in the driving method of the display panel provided by at least one embodiment of the present disclosure, by the pixel driving chips in the plurality of pixel circuits, driving the at least one light-emitting element in each pixel circuit of the plurality of pixel circuits to emit light according to the data signals, respectively, comprises: applying second voltages to second electrodes of the at least one light-emitting element in each pixel circuit of the plurality of pixel circuits, respectively; and by the pixel driving chips, controlling currents flowing through the at least one light-emitting element in each pixel circuit of the plurality of pixel circuits according to the data signals, respectively, to drive the at least one light-emitting element in each pixel circuit of the plurality of pixel circuits to emit light.

For example, in the driving method of the display panel provided by at least one embodiment of the present disclosure, each of the pixel driving chips comprises at least one second terminal which is connected to the at least one light-emitting element in a one-to-one correspondence manner, and the driving method comprises: in a display phase of a (N−1)-th frame of image, storing a plurality of data signals, which correspond to a N-th frame of image, in the pixel driving chips of the plurality of pixel circuits, respectively; and in a display phase of the N-th frame of image, applying second voltages to second electrodes of light-emitting elements of pixel circuits in respective rows, respectively controlling corresponding currents flowing through the at least one light-emitting element electrically connected to each of the pixel driving chips according to the plurality of data signals stored in the pixel driving chips, to drive the light-emitting elements of pixel circuits in the respective rows to emit light; N is an integer greater than 1.

For example, in the driving method of the display panel provided by at least one embodiment of the present disclosure, each of the plurality of pixel circuits comprises at least one second terminal which is connected to the at least one light-emitting element in a one-to-one correspondence manner, and the driving method comprises: storing the plurality of data signals corresponding to an N-th frame of image row by row in a display phase of the N-th frame of image; and applying second voltages to second electrodes of light-emitting elements in a plurality of rows of pixel circuits row by row to drive light-emitting elements in the plurality of rows of pixel circuits to emit light row by row according to the plurality of data signals that are stored; N is an integer greater than 1.

For example, in the driving method of the display panel provided by at least one embodiment of the present disclosure, the at least one light-emitting element comprises a plurality of light-emitting elements, and the driving method comprises: sequentially applying currents to a plurality of light-emitting elements, which are respectively electrically connected to each pixel driving chip of pixel driving chips of respective rows, according to the plurality of data signals; and according to a timing sequence at which the currents are applied to the plurality of light-emitting elements, applying second voltages row by row to second electrodes of the plurality of light-emitting elements, which are electrically connected to each pixel driving chip of the pixel driving chips of respective rows, to drive the plurality of light-emitting elements to emit light in a time-sharing manner.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

In order to make objects, technical solutions, and advantages of the embodiments of the present disclosure apparent, the technical solutions of the embodiments of the present disclosure will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms “first,” “second,” etc., which are used in the present disclosure, are not intended to indicate any sequence, amount or importance, but distinguish various components. The terms “comprise,” “comprising,” “include,” “including,” etc., are intended to specify that the elements or the objects stated before these terms encompass the elements or the objects and equivalents thereof listed after these terms, but do not preclude the other elements or objects. The phrases “connect”, “connected”, etc., are not intended to define a physical connection or mechanical connection, but may include an electrical connection, directly or indirectly. “On,” “under,” “right,” “left” and the like are only used to indicate relative position relationship, and when the position of the object which is described is changed, the relative position relationship may be changed accordingly.

With the development of a display panel manufacturing industry, the development of emerging display technologies, such as Mini LED, is in full swing. On one hand, traditional PCB (Printed Circuit Board) substrates are limited by PCB technology and SMT (surface mounting technology) technology, and cannot achieve high-resolution display; on the other hand, the PCB layers are many, the design is complicated, the cost is high, and the market response is not very good. Therefore, compared to the Mini LED display module using the PCB substrate, the Mini LED display module using the glass substrate has the advantages of low cost, achieving a smaller chip pitch, and achieving UHD (Ultra High Definition) display or 8K display resolution, and the like. Related display modules using glass substrates have a relatively small distance between light-emitting diodes and a thickness of the copper wire is relatively thin, which severely limits the number of wires, so the high multiplexing (MUX) solution is adopted to reduce the driving wires. However, this high MUX solution will cause problems, such as increased LED current, higher overall power consumption, poorer display effect, etc.

Figure 1A:
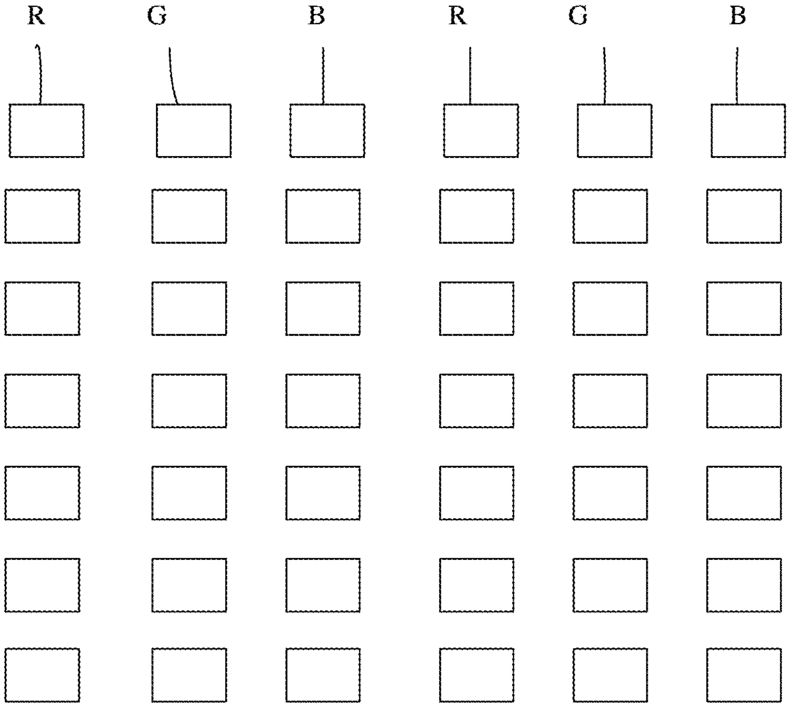
FIG. 1A shows an arrangement of pixels.

At present, in a Mini LED display solution, RGB pixels including Mini LEDs are usually arranged as shown in FIG. 1A. However, this arrangement has the problem of excessive wires. If the static display is used, each Mini LED needs to lead out a cathode wire or anode wire to control the display gray scale of each Mini LED. However, in fact, limited by the size of the display panel, it may not be possible to achieve too many wires; moreover, in the case where the number of wires is limited, even if a scan driving method (for example, the scan method shown in FIG. 1B) is adopted, 16 scans or 32 scans or higher scan times are required to achieve the image display. However, as the number of scan times (the scan frequency) increases, in order to enable the display panel to achieve the same brightness, the current flowing through a single Mini LED will increase exponentially, thereby increasing the power consumption of the display panel.

Figure 1B:
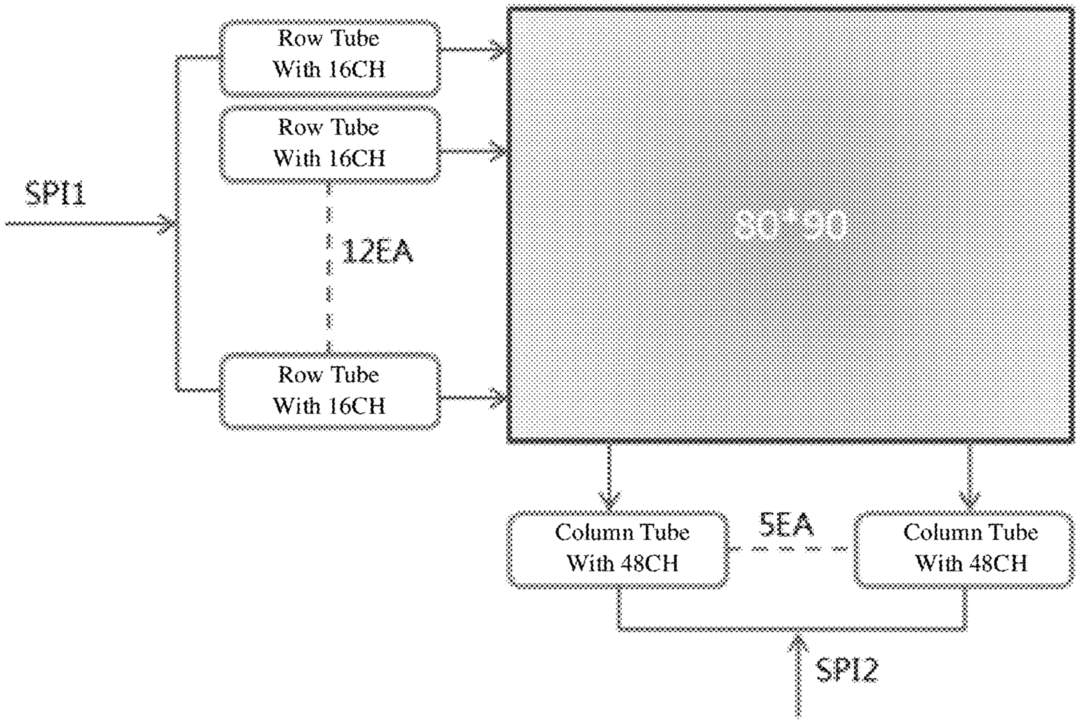
FIG. 1B is a scan driving method of the pixels shown in FIG. 1A.

At the same time, the arrangement shown in FIG. 1A has higher requirements for the drive design. Especially for glass-based products (that is, products that use glass substrates), due to the limited wiring methods, row control units and column control units are generally required to drive the entire module. As shown in FIG. 1B, for example, for a display panel with a resolution of 80*90, each row control unit includes a plurality of (for example, as shown in FIG. 1B, including 12EA (12)) row tubes (i.e., row driving chips) with 16CH (i.e., 16 channels), each column control unit includes a plurality of (for example, as shown in FIG. 1B, including 5EA (5)) column tubes (i.e., constant current chips) with 48CH (i.e., 48 channels). For example, each row tube and each column tube can be connected to peripheral circuits through SPI (Serial Peripheral Interface) to receive corresponding signals. As the resolution of the display panel increases, the number of wires that provide scan signals and data signals to the display panel increases, accordingly, and therefore, a large number of row control units and a large number of column control units are required, which will cause the area and number of layers of the PCB board to increase, thereby increasing the cost of the display panel and reducing the display effect of the display panel.

Moreover, because Mini LED products on the array substrate use passive driving, the signals of the cathode and anode of the Mini LED are output through the driving chip, the switch circuits of all light-emitting elements are formed on the driving chip, which will increase the cost of the driving chip of the Mini LED and accordingly increase the process complexity of the Mini LED. In addition, because corresponding signals are provided to the cathode and the anode of the Mini LED by disposing separate wires, and considering factors, such as a large current required, for the Mini LED to emit light, the substrate usually adopts a electroplating process of double Cu (copper) wire layers to dispose the wires that provides signals to the cathode and the anode of the Mini LED. For example, one Cu wiring layer uses a Cu film with a thickness of 10 μm (micrometers), and the other Cu wiring layer needs to use a Cu film with a thickness of 5 μm. The greater the thickness of the Cu film, the greater the deformation of the substrate, and the greater the process difficulty; in addition, the greater the thickness of the Cu wire, the greater the thickness of the flat layer on the substrate, which enables the process to be more difficult. Therefore, the electroplating process of the double Cu wire layers increases the cost of the array substrate using Mini LEDs.

At least one embodiment of the present disclosure provides a display panel comprising: a substrate and a plurality of pixel circuits arranged in an array on the substrate, each of the plurality of pixel circuits comprises a pixel driving chip and at least one light-emitting element electrically connected to the pixel driving chip, and the pixel driving chip is configured to receive and store a data signal and drive the at least one light-emitting element to emit light according to the data signal.

Some embodiments of the present disclosure also provide a display device and a driving method corresponding to the above-mentioned display panel.

The display panel provided by the above-mentioned embodiments of the present disclosure can reduce the number of scan times and reduce the power consumption of the display panel without increasing the wires.

The embodiments and examples of the present disclosure will be described in detail below with reference to the accompanying drawings.

Figure 2A:
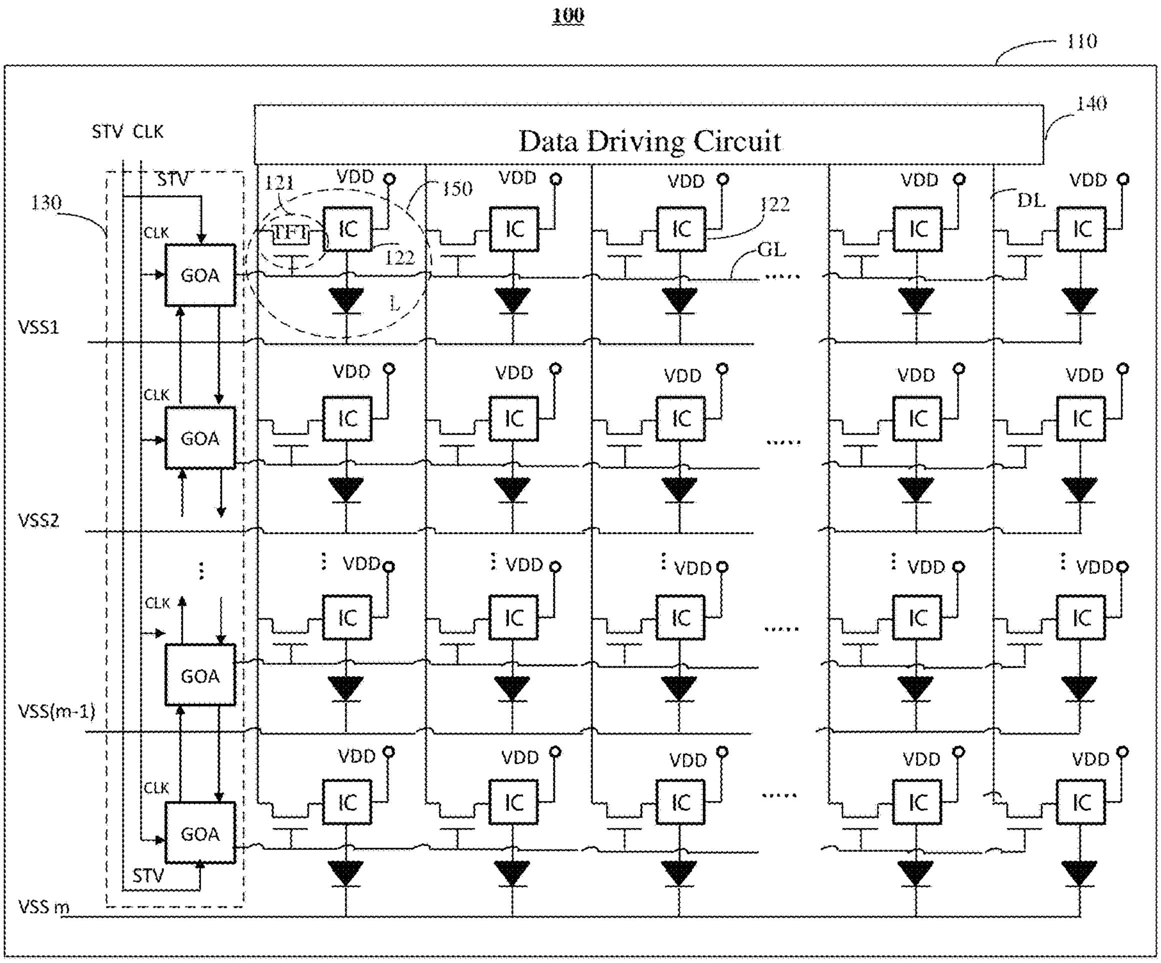
FIG. 2A is a schematic diagram of an example of a display panel provided by at least one embodiment of the present disclosure.

FIG. 2A is a schematic diagram of a display panel provided by at least one embodiment of the present disclosure. The display panel provided by at least one embodiment of the present disclosure will be described in detail below with reference to FIG. 2A.

For example, as shown in FIG. 2A, the display panel 100 includes a substrate 110 and a plurality of pixel circuits 150 arranged in an array on the substrate 110, for example, includes pixel circuits arranged in m rows and n columns, m and n are both integers greater than 1.

For example, each of the plurality of pixel circuits 150 includes a pixel driving chip 122 and at least one light-emitting element L electrically connected to the pixel driving chip 122. For example, FIG. 2A only schematically shows that one pixel driving chip 122 is connected to one light-emitting element L. In other examples, for example, in the examples shown in FIGS. 3A-5B, one pixel driving chip 122 is connected to Q light-emitting elements L, and Q is an integer greater than 1, for example, in some examples, Q is an integer multiple of m. The embodiments of the present disclosure are not limited to this case. For example, the at least one light-emitting element includes at least two light-emitting elements, and the at least two light-emitting elements emit light of different colors. For example, the light-emitting element may be a Mini LED or a miniature light-emitting diode, or other light-emitting diodes, and the embodiments of the present disclosure are not limited to the type of the light-emitting element.

For example, the pixel driving chip 122 is configured to receive and store a data signal and drive the at least one light-emitting element L to emit light according to the data signal. For example, the pixel driving chip may be separately manufactured and then mounted on the substrate 110 through, for example, a surface mount process (SMT), for example, may be connected to peripheral circuits (for example, a gate scan circuit and a data driving circuit that will be described below), a power supply, or a light-emitting element through lead wires on pins; or the pixel driving chip may also be directly formed on the substrate 110 to achieve the corresponding function. For example, the pixel driving chip can be obtained by preparing the pixel driving chip on a silicon wafer and cutting the silicon wafer. For example, the pixel driving chip and the Mini LED can be bound on the substrate.

Figure 3A:
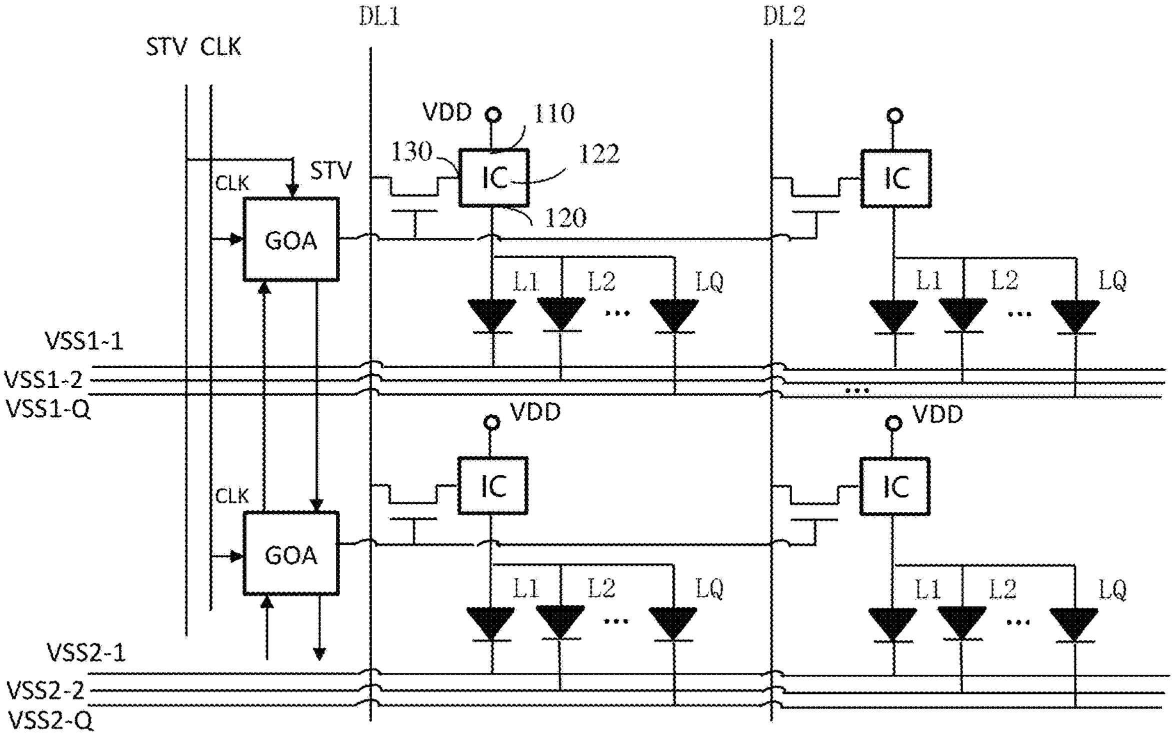
FIG. 3A is a schematic diagram of an example of another display panel provided by at least one embodiment of the present disclosure.

For example, as shown in FIG. 3A, the pixel driving chip 122 includes a first terminal 110, a second terminal 120, and a third terminal 130, and is configured to control the current flowing through at least one light-emitting element L according to the data signal. It should be noted that other embodiments are the same as those described herein, and similar portions will not be repeated again.

For example, each of the at least one light-emitting element L includes a first electrode and a second electrode, for example, in some examples, in the examples shown in FIGS. 2A, 3A, 4, 5A, and 6A, in the case where the light-emitting elements L in each row are connected in a common cathode connection mode, the first electrode of the light-emitting element L is an anode and the second electrode of the light-emitting element L is a cathode. It should be noted that in other examples, for example, in the examples shown in FIGS. 2C, 3B, 5B, and 6B, in the case where the light-emitting elements L in each row adopt a common anode connection mode, the first electrode of the light-emitting element L is a cathode and the second electrode of the light-emitting element L is an anode. The details may be determined according to actual conditions, and the embodiments of the present disclosure are not limited to this case.

Hereinafter, the display panel will be described by taking the case that the light-emitting elements in each row adopt the common cathode connection mode as an example.

For example, as shown in FIG. 2A, the first terminal 110 of the pixel driving chip 122 is connected to a first voltage terminal VDD to receive a first voltage, and the second terminal 120 of the pixel driving chip 122 is connected to the first electrode (for example, the anode) of the at least one light-emitting element L.

Figure 2B:
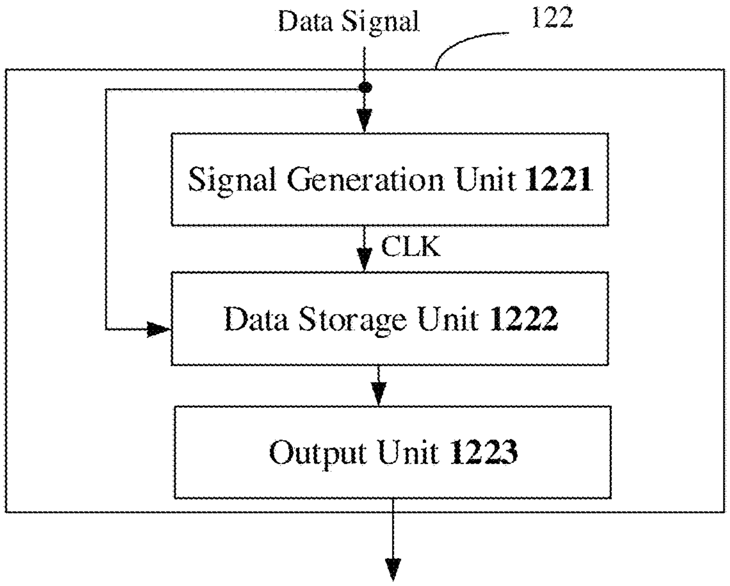
FIG. 2B is a schematic diagram of a pixel driving chip provided by at least one embodiment of the present disclosure.

For example, in some examples, as shown in FIG. 2B, the pixel driving chip 122 may include a signal generation unit 1221, a data storage unit 1222, and an output unit 1223. For example, the signal generation unit 1221 is used for receiving the data signal and generating signals, such as a clock signal CLK, etc., required by the pixel driving chip to work according to the data signal; the data storage unit 1222 is configured to store the data signal; the output unit 1223 is configured to output the current flowing through the light-emitting element according to the stored data signal, so as to drive the corresponding light-emitting element L to emit light according to the required gray scale (corresponding to the data signal) during a display phase of the display panel. These units are implemented in hardware (for example, circuits), firmware, or software, and any combination thereof, for example. For example, the pixel driving chip can use various chips in the art that can drive the light-emitting element, and the embodiments of the present disclosure are not limited to this case.

For example, the display panel shown in FIG. 2A can store data signals of an N-th frame to the pixel driving chip in the display phase of the (N−1)-th frame, and then the pixel driving chip may simultaneously drive all the light-emitting elements to emit light according to the stored data signals in the display phase of the N-th frame, so that the display of the display panel can be achieved through only one scan, and therefore, the number of scan times of the display panel can be reduced, and the power consumption of the display panel can be reduced.

In the display panel provided by the embodiments of the present disclosure, by storing the data signal in the pixel driving chip first and then driving the light-emitting element to emit light based on the stored data signal in the display phase, the number of scan times of the display panel can be reduced, and the power consumption of the display panel can be reduced. On the other hand, in the display panel, a pixel driving chip with simple function and low cost is provided in each pixel circuit to output a current signal that controls the light-emitting element to emit light, so that the manufacturing cost of the display panel can be greatly reduced, at the same time, this arrangement can also simplify the double Cu wire layers on the substrate connected to the cathode and the anode of the light-emitting element to a single Cu wire layer, thereby reducing the cost of the display panel, improving the resolution of the display panel, and greatly improving the user experience.

For example, in other examples, as shown in FIG. 2A, the display panel 100 further includes a gate driving circuit 130, a plurality of gate lines GL, a data driving circuit 140, and a plurality of data lines DL, which are disposed on the substrate 110.

For example, the pixel circuit 150 includes a data writing circuit 121, and the data writing circuit 121 is connected to the pixel driving chip 122 and is configured to write a data signal to the pixel driving chip 122 in response to a scan signal; the gate driving circuit 130 is electrically connected to data writing circuits 121 of a plurality of rows of pixel circuits through the plurality of gate lines GL, respectively, and is configured to provide a plurality of scan signals to the data writing circuits 121 of the plurality of rows of pixel circuits, respectively; and the data driving circuit 140 is electrically connected to data writing circuits 121 of a plurality of columns of pixel circuits through the plurality of data lines DL, respectively, and is configured to provide a plurality of data signals to the data writing circuits 121 of the plurality of columns of pixel circuits, respectively.

For example, the data writing circuit 121 includes a data writing transistor TFT, a gate electrode of the data writing transistor TFT is electrically connected to the gate driving circuit 130 through a gate line GL connected to the data writing transistor TFT to receive the scan signal; a first electrode of the data writing transistor TFT is electrically connected to the data driving circuit 140 through a data line DL, which is connected to the data writing transistor TFT, to receive the data signal, and a second electrode of the data writing transistor TFT is electrically connected to the third terminal 130 of the pixel driving chip 122. For example, the data writing transistor TFT is turned on in response to the scan signal, and writes the data signal provided by the data driving circuit 140 into the pixel driving chip 122 for storage, so that the data signal is used to drive the light-emitting element to emit light during the display phase.

For example, the gate driving circuit 130 may include a plurality of cascaded shift register units GOA configured to shift and output scan signals under the control of a trigger signal STV and a clock signal CLK provided by a peripheral circuit (for example, a timing controller), the specific cascading mode and working principle of the shift register units GOA can refer to the design in the art, and will not be repeated here. The data driving circuit 140 can also refer to the design in the art, and will not be repeated here.

In this example, by integrating the gate driving circuit, the data driving circuit, the pixel driving chip, the light-emitting element L, etc. on the same substrate, the data signal can be stored into the pixel driving chip by an AM (Active-matrix) driving method. For example, in the display phase, according to the actual situation, the second voltages provided by the second voltage lines are applied to the second electrodes of the light-emitting elements L at the same time or row by row, so that the pixel driving chip controls the current flowing through the light-emitting element according to the stored data signal, so as to drive the light-emitting element L to emit light according to a certain gray scale (data signal). That is, in the display phase, the driving of the light-emitting element still adopts a PM (Passive-Matrix, passive) driving method. Therefore, in the embodiments of the present disclosure, the AM driving method and the PM driving method can be combined to achieve the driving of the light-emitting element.

For example, in some examples, the pixel driving chip 122 includes a single second terminal 120 (that is, one second terminal 120), and the second terminal 120 is electrically connected to the first electrode of the at least one light-emitting element L. For example, in the example shown in FIG. 2A, the at least one light-emitting element includes one light-emitting element L, and the second electrodes of the light-emitting elements L of pixel circuits in each row are connected to the same second voltage line to receive the second voltage (for example, a low voltage lower than the first voltage). For example, the light-emitting elements L of the pixel circuits in the first row are connected to a first one VSS1 of the second voltage lines to receive the second voltage, the light-emitting elements L of the pixel circuits in the second row are connected to a second one VSS2 of the second voltage lines to receive the second voltage, the light-emitting elements L of the pixel circuits in the (m−1)-th row are connected to a (m−1)-th second voltage line VSS(m−1) to receive the second voltage, and the light-emitting elements L of the pixel circuits in the m-th row are connected to an m-th second voltage line VSSm to receive the second voltage.

For example, the first terminal of the pixel driving chip 122 is connected to the first voltage terminal VDD (for example, a high voltage terminal) to receive the first voltage, the light-emitting element L is connected to the pixel driving chip 122 to receive the current flowing through the light-emitting element and controlled by the pixel driving chip, therefore, in the case where the second voltage lines in respective rows provide an effective second voltage, the first electrode and the second electrode of the light-emitting element can form a path to emit light of corresponding intensity based on the current controlled by the pixel driving chip, so as to achieve the display of the corresponding gray scale. Therefore, the timing sequence for the second voltage line providing the second voltage can be controlled by the timing sequence, so as to control the light-emitting elements of the corresponding row to be turned on. The specific driving method will be described in detail below, and will not be repeated here.

Figure 2C:
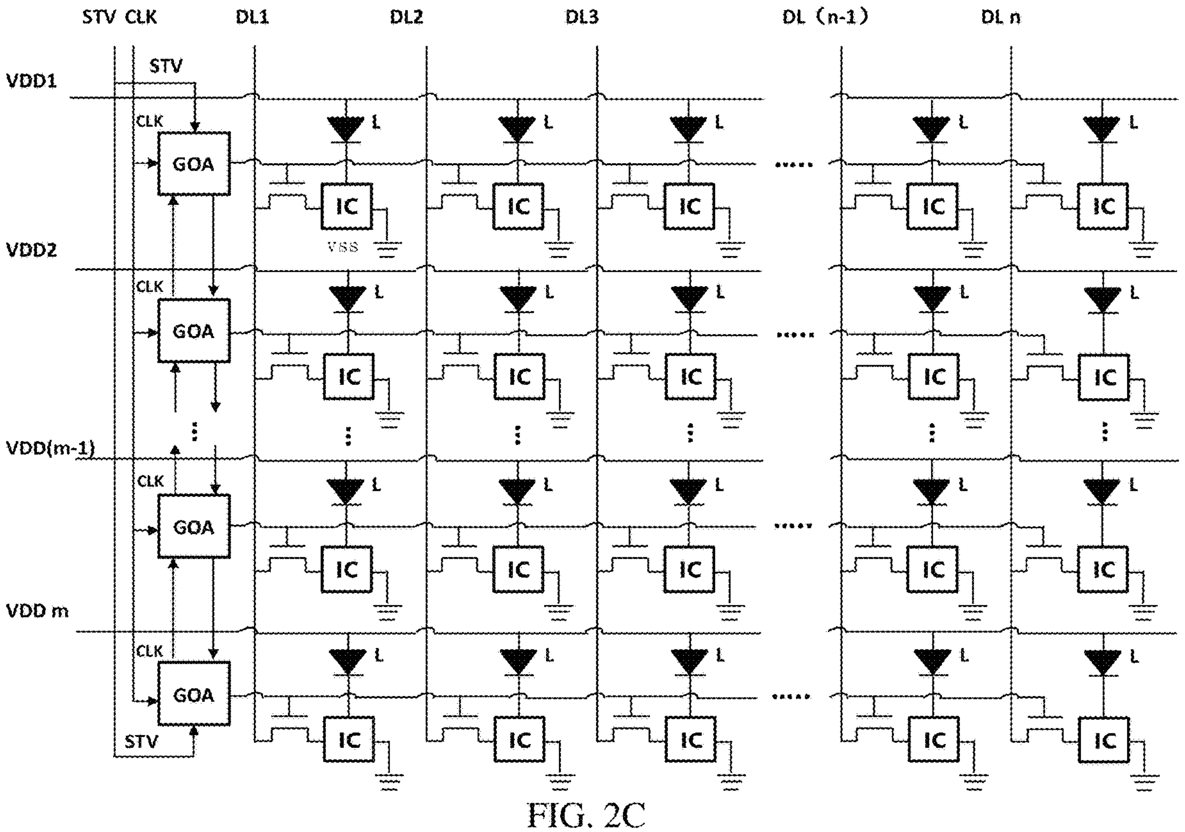
FIG. 2C is a schematic diagram of another example of a display panel provided by at least one embodiment of the present disclosure.

For example, the example shown in FIG. 2C is basically the same as the example shown in FIG. 2A, except that: the light-emitting elements shown in FIG. 2C adopt a common anode connection mode, the first terminal 110 of the pixel driving chip 122 is connected to a first voltage terminal VSS to receive a first voltage (for example, a ground voltage), the second terminal 120 of the pixel driving chip 122 is connected to the first electrode (for example, the cathode) of the at least one light-emitting element L, the second electrodes of the light-emitting elements L of pixel circuits in each row are connected to the same second voltage line in the second voltage line VDD1-VDDm to receive the second voltage (for example, a high voltage, higher than the first voltage), so that in this example, by controlling the voltages applied to the second electrodes (for example, the anode) of the light-emitting elements in each row of light-emitting elements row by row, the light-emitting elements in each row are controlled to be turned on, so as to output the current generated by the pixel driving chip according to the corresponding data signal to each light-emitting element, so that the light-emitting element emits light of correspondingly gray scale. The connection manner of each terminal of the pixel driving chip 122 may be determined according to specific conditions, and the embodiments of the present disclosure are not limited to this case. For specific introduction of other structures of the example shown in FIG. 2C, reference may be made to the related description in FIG. 2A, and similar portions are not repeated here.

For example, in other examples, at least one light-emitting element in the pixel circuit includes a plurality of light-emitting elements, and the pixel driving chip includes a plurality of second terminals, the plurality of second terminals are electrically connected to the first electrodes of the plurality of light-emitting elements in a one-to-one correspondence manner. For example, in the example shown in FIG. 3A, the at least one light-emitting element includes a plurality of light-emitting elements, for example, includes Q light-emitting elements L, and the pixel driving chip 122 includes one second terminal 120 to be connected to the Q light-emitting elements L.

For example, as shown in FIG. 3A, the display panel 100 further includes a plurality of groups of second voltage lines, and the plurality of groups of second voltage lines are connected to a plurality of rows of pixel circuits in a one-to-one correspondence manner. For example, FIG. 3A only schematically illustrates pixel circuits arranged in 2 rows and 2 columns, the display panel includes two groups of second voltage lines VSS1-1 to VSS1-Q and VSS2-1 to VSS2-Q, to be connected correspondingly to two rows of pixel circuits shown in FIG. 3A. Of course, the specific settings can be determined according to actual conditions, and the embodiments of the present disclosure are not limited to this case. For example, as shown in FIG. 3A, a first data line DL1 and a second data line DL2 are connected to the pixel circuits arranged in 2 rows and 2 columns, the first data line DL1 and the second data line DL2 are connected to the data driving circuit, and are used to provide data signals to respective columns of pixel circuits connected thereto, respectively.

For example, as shown in FIG. 3A, the plurality of light-emitting elements includes Q light-emitting elements L1-LQ, and each group of second voltage lines includes Q second voltage lines. For example, a q-th second voltage line of the Q second voltage lines is connected to q-th light-emitting elements respectively electrically connected to respective pixel driving chips of the pixel circuits in the corresponding row, and q is an integer greater than 0 and less than or equal to N. For example, a first light-emitting element L1 connected to a first pixel driving chip in the first row and a first light-emitting element L1 connected to a second pixel driving chip in the first row are both connected to a first one VSS1-1 of the Q second voltage lines of the first group, a second light-emitting element L1 connected to the first pixel driving chip in the first row and a second light-emitting element L1 connected to the second pixel driving chip in the first row are both connected to a second one VSS1-2 of the Q second voltage lines of the first group, and so on.

Figure 3B:
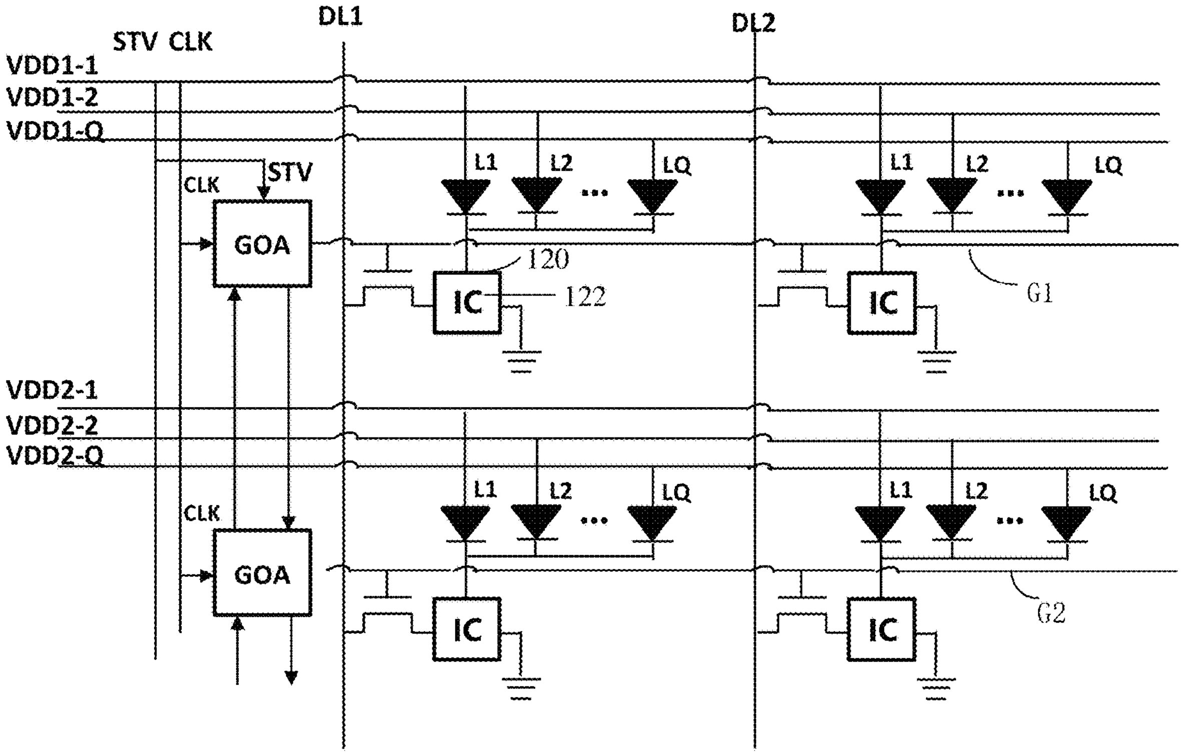
FIG. 3B is a schematic diagram of another example of another display panel provided by at least one embodiment of the present disclosure.

The structure of the display panel shown in FIG. 3B is similar to that of the display panel shown in FIG. 3A, except that: the light-emitting elements of respective rows included in the display panel shown in FIG. 3B adopt a common anode connection manner, that is, the first light-emitting element L1 connected to the first pixel driving chip in the first row and the first light-emitting element L1 connected to the second pixel driving chip in the first row are both connected to the first one VDD1-1 of the second voltage lines of the first group, the second light-emitting element L1 connected to the first pixel driving chip in the first row and the second light-emitting element L1 connected to the second pixel driving chip in the first row are both connected to the second one VDD1-2 of the second voltage lines of the first group, and so on.

Figure 7:
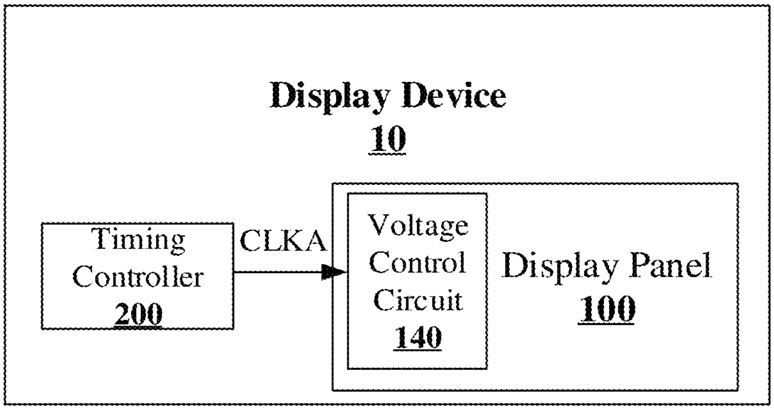
FIG. 7 is a schematic diagram of a display device provided by at least one embodiment of the present disclosure.

For example, in this example, as shown in FIG. 7, the display panel 100 further includes a voltage control circuit 140, the voltage control circuit 140 is connected to the plurality of groups of second voltage lines VSS, and is configured to sequentially apply the second voltages to the Q second voltage lines in each group of second voltage lines according to a timing sequence (for example, the timing sequence of the clock signal CLKA) of applying currents corresponding to the corresponding data signals to the Q light-emitting elements connected to respective pixel driving chips by the respective pixel driving chips, so as to drive the Q light-emitting elements to sequentially emit light according to the corresponding data signals. For example, the timing sequence for sending the data signals corresponding to the Q light-emitting elements to the Q light-emitting elements can be controlled by a clock signal, at the same time, the voltage control circuit 140 controls the second voltage lines respectively connected to the Q light-emitting elements to provide corresponding voltages according to the clock signal, so that in the case where the data signal corresponding to the q-th light-emitting element among the Q light-emitting elements is displayed, the second voltage can be controlled to be applied to the q-th second voltage line connected to the q-th light-emitting element. For example, the timing sequence of the clock signal is provided by a peripheral circuit, such as a timing controller 200. For example, the timing controller 200 is configured to provide the clock signal to the voltage control circuit 140 in the display panel, so that the voltage control circuit 140 controls the timing sequence for sending the second voltage to respective second voltage lines according to the clock signal, thereby achieving the display of the display panel. Through this connection and control method, it can be avoid that in the case where the pixel driving chip has only one second terminal, the Q light-emitting elements connected to the pixel driving chip emit the same light.

Assuming that Q data signals that are in one-to-one correspondence to Q light-emitting elements are stored in the pixel driving chip, for example, the first light-emitting element L1 emits light according to the first data signal, the second light-emitting element L2 emits light according to the second data signal, and so on, the Q-th light-emitting element LQ emits light according to the Q-th data signal. However, because the Q light-emitting elements are all connected to the pixel driving chip 122 through one second terminal 120, respective currents corresponding to the data signals stored in the pixel driving chip 122 will flow through the Q light-emitting elements at the same time. Therefore, in order to enable the Q light-emitting elements to emit light corresponding to the corresponding data signals, respectively, the second voltages may be applied row by row to the Q second voltage lines of the first group. For example, in the case where a current corresponding to the first data signal is applied to Q light-emitting elements, in order to enable the first light-emitting element L1 to emit the corresponding light, in this case, a second voltage is applied to the first one VSS1-1 of the second voltage lines of the first group connected to the first light-emitting element L1, so as to form a path at the first light-emitting element L1; in the case where a current corresponding to the second data signal is applied to the Q light-emitting elements, in order to enable the second light-emitting element L2 to emit the corresponding light, in this case, a second voltage is applied to the second one VSS1-2 of the second voltage lines of the first group connected to the second light-emitting element L2, and so on. Therefore, by controlling the timing sequence of the second voltages applied to respective second voltage lines in each group, respective light-emitting elements corresponding to each pixel driving chip can be controlled to emit light of corresponding gray scales, respectively.

For example, in other examples, the pixel driving chip 122 includes a plurality of second terminals 120, and the plurality of second terminals 120 are electrically connected to the first electrodes of the plurality of light-emitting elements L in a one-to-one correspondence manner.

Figure 4:
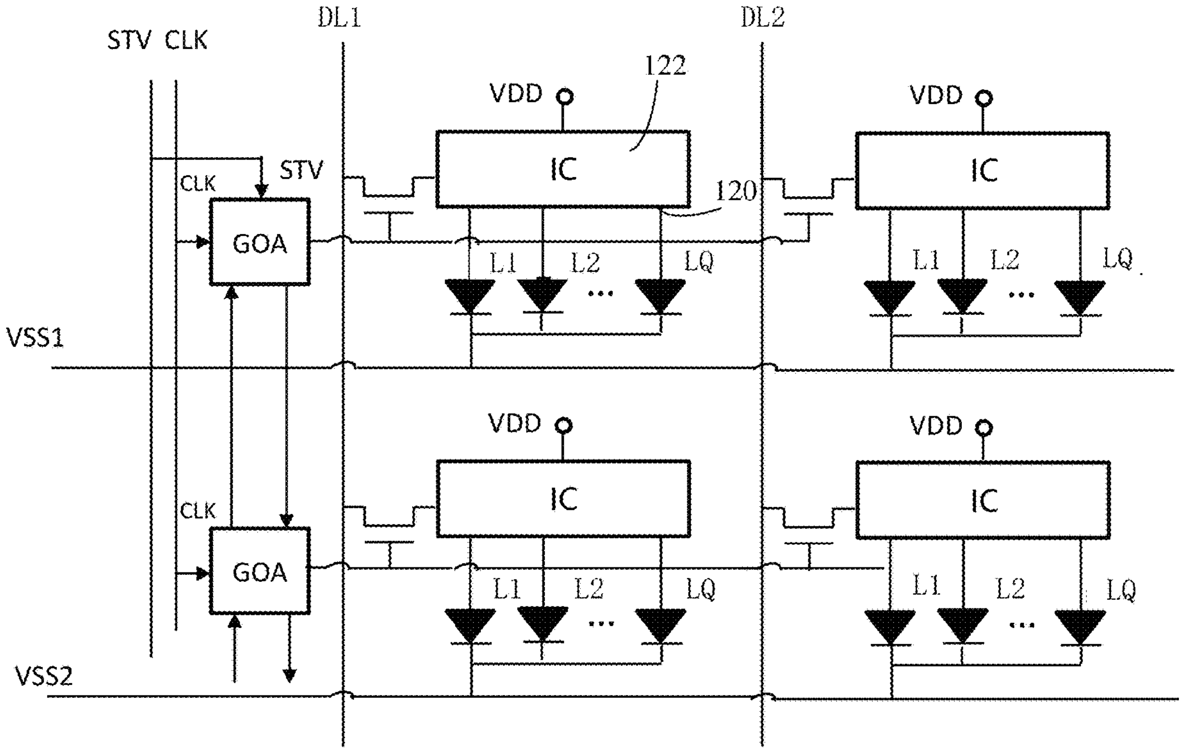
FIG. 4 is a schematic diagram of another display panel provided by at least one embodiment of the present disclosure.

For example, as shown in FIG. 4, the pixel driving chip 122 includes Q second terminals 120, and the Q second terminals 120 are electrically connected to the first electrodes of the Q light-emitting elements L in a one-to-one correspondence manner, so that the respective second terminals output currents corresponding to the respective light-emitting elements, respectively, to drive the respective light-emitting elements to emit light according to the required gray scales, respectively. Because the currents corresponding to different data signals and flowing through the respective light-emitting elements of pixel circuits in each row can be applied to the corresponding light-emitting elements through the plurality of second terminals, respectively, the second electrodes of the respective light-emitting elements can be connected to the same second voltage line to receive the second voltage, for example, the second voltage lines in respective rows can apply the second voltages at the same time or row by row, so that the light-emitting elements in the pixel circuits in respective rows can form paths in the case where the second voltages are applied to the second electrodes of the light-emitting elements, and emit light corresponding to the gray scales. Therefore, in this example, not only the number of wires (for example, the second voltage lines) is reduced, the number of scan times of the display panel is also reduced, the power consumption of the display panel is reduced, and the display quality of the display panel is improved.

It should be noted that in the case where the light-emitting elements in each row adopt a common anode connection manner, the structure corresponding to FIG. 4 can also be adopted, that is, in the case where the pixel driving chip 122 includes a plurality of second terminals 120 and the plurality of second terminals 120 are electrically connected to the cathodes of the plurality of light-emitting elements L in a one-to-one correspondence manner, the anodes of the light-emitting elements in each row can be connected to the same voltage line providing a high level, the working principle of the display panel is similar to the working principle of the display panel shown in FIG. 4, and will not be repeated here.

Figure 5A:
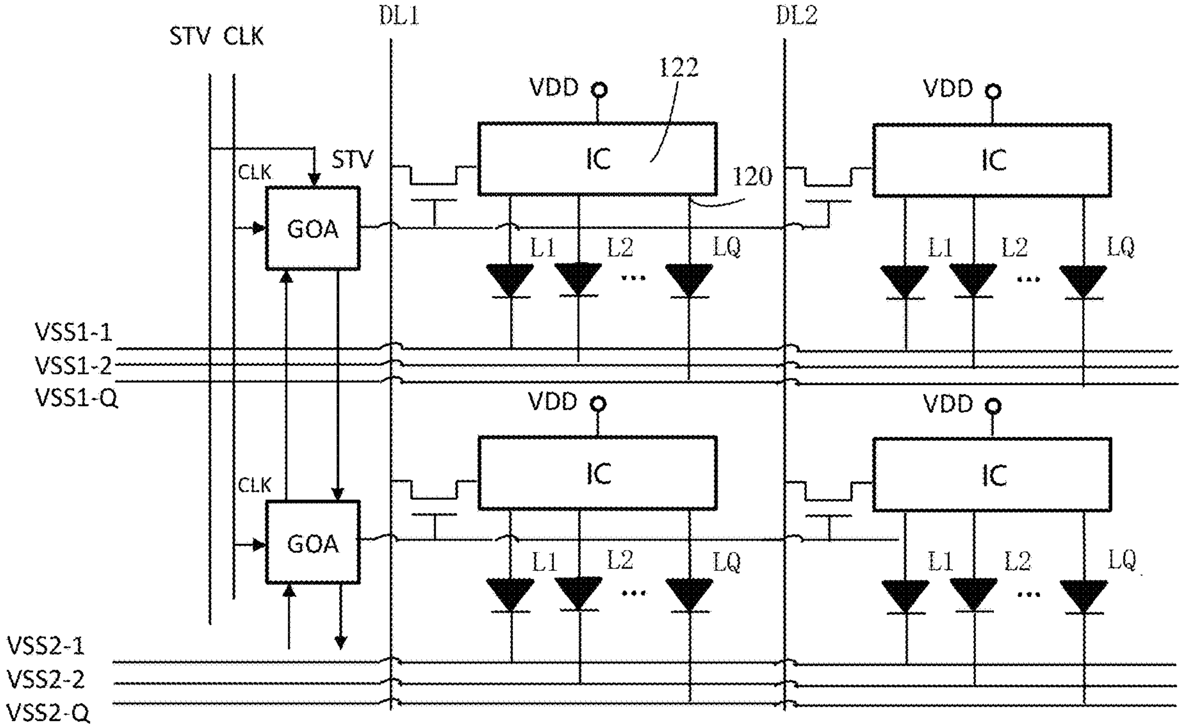
FIG. 5A is a schematic diagram of an example of another display panel provided by at least one embodiment of the present disclosure.

In other examples, for example, in the example shown in FIG. 5A, the plurality of light-emitting elements includes Q light-emitting elements L1-LQ, and each group of second voltage lines includes Q second voltage lines. For example, the q-th second voltage line of the Q second voltage lines is connected to the q-th light-emitting elements respectively electrically connected to respective pixel driving chips of the pixel circuits in the corresponding row, q is an integer greater than 0 and less than or equal to Q. For example, a first light-emitting element L1 connected to a first pixel driving chip in the first row and a first light-emitting element L1 connected to a second pixel driving chip in the first row are both connected to a first one VSS1-1 of the second voltage lines of the first group, a second light-emitting element L1 connected to the first pixel driving chip in the first row and a second light-emitting element L1 connected to the second pixel driving chip in the first row are both connected to the second one VSS1-2 of the second voltage lines of the first group, and so on.

For example, in this example, the display panel 100 further includes a voltage control circuit 140, the voltage control circuit 140 is connected to the plurality of groups of second voltage lines, and is configured to sequentially apply the second voltages to the Q second voltage lines in each group of second voltage lines according to a timing sequence of applying currents corresponding to the corresponding data signals to the Q light-emitting elements connected to respective pixel driving chips by the respective pixel driving chips, so as to drive the Q light-emitting elements to sequentially emit light according to the corresponding data signals. Through this connection method, the Q light-emitting elements can be controlled to emit light row by row. For example, the timing sequence of sending the data signals corresponding to the Q light-emitting elements to the Q light-emitting elements can be controlled by the clock signal, at the same time, the voltage control circuit controls the second voltage lines respectively connected to the Q light-emitting elements to provide corresponding voltages according to the clock signal, so that in the case where the data signal corresponding to the q-th light-emitting element among the Q light-emitting elements is displayed, the second voltage can be controlled to be applied to the q-th second voltage line connected to the q-th light-emitting element.

In the embodiments of the present disclosure, such a design method can effectively reduce the number of shift register units GOA in the gate driving circuit, and can effectively reduce the size and design difficulty of the display panel.

Figure 5B:
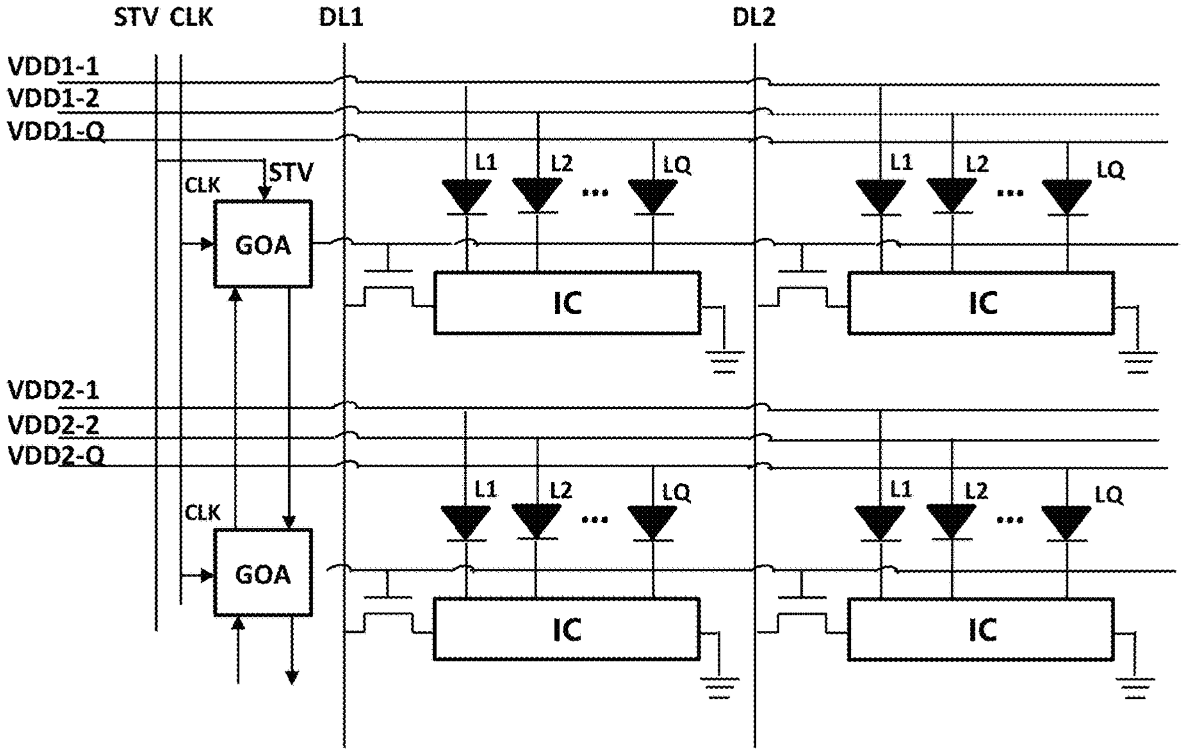
FIG. 5B is a schematic diagram of another example of another display panel provided by at least one embodiment of the present disclosure.

The display panel shown in FIG. 5B is similar to the display panel shown in FIG. 5A, except that: the light-emitting elements in the display panel shown in FIG. 5B adopt a common anode connection manner, for example, the first light-emitting element L1 connected to the first pixel driving chip in the first row and the first light-emitting element L1 connected to the second pixel driving chip in the first row are both connected to the first one VDD1-1 of the second voltage lines of the first group, the second light-emitting element L1 connected to the first pixel driving chip in the first row and the second light-emitting element L1 connected to the second pixel driving chip in the first row are both connected to the second one VDD1-2 of the second voltage lines of the first group, and so on. That is, the voltage control circuit controls the timing sequence of the voltage applied to the anode of the light-emitting element. The working principle of the display panel shown in FIG. 5B is similar to the working principle of the display panel shown in FIG. 5A, and will not be repeated here.

Figure 6A:
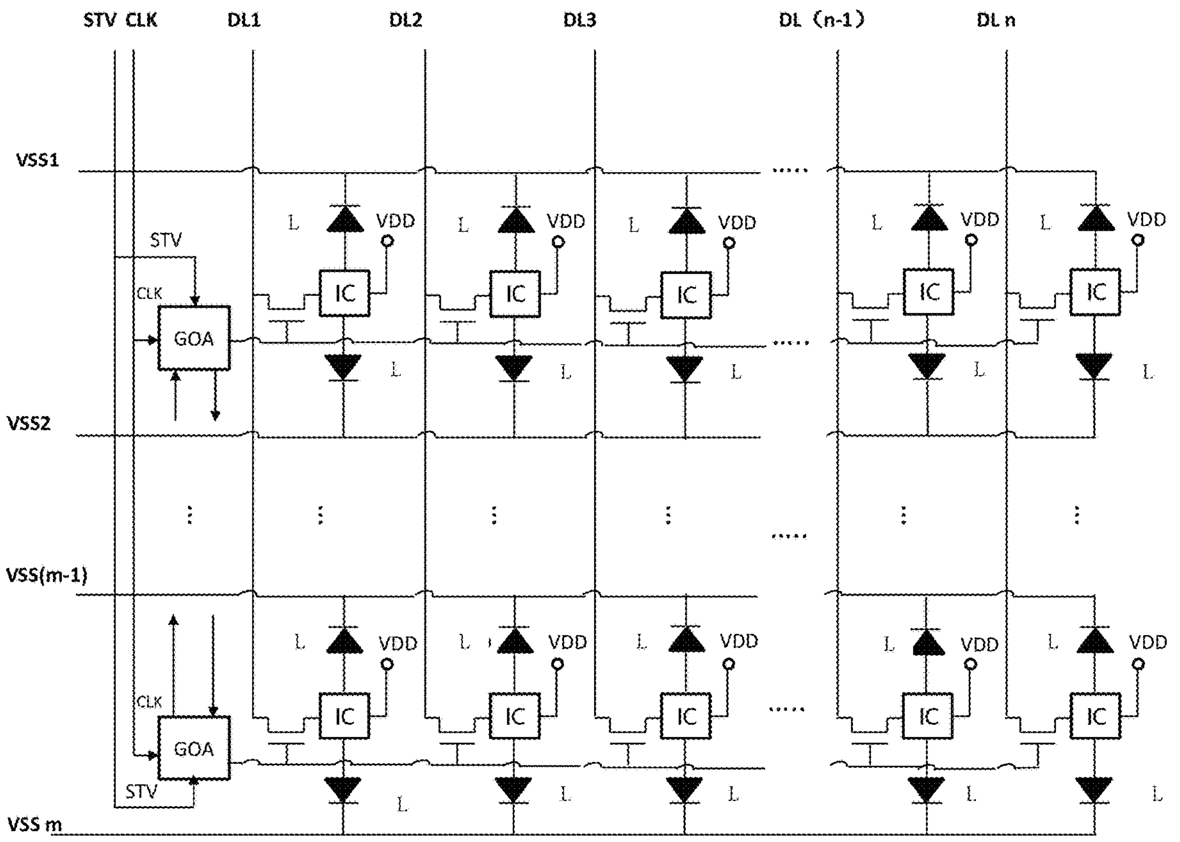
FIG. 6A is a schematic diagram of an example of another display panel provided by at least one embodiment of the present disclosure.

For example, in the example shown in FIG. 6A, each pixel driving chip 122 is only connected to two light-emitting elements, and the pixel driving chip includes two second terminals, the second electrodes of the two light-emitting elements are connected to different second voltage lines, respectively, for specific introduction, please refer to the related introduction of FIG. 5A, which will not be repeated here.

In this example, the number of shift register units GOA in the gate driving circuit can be reduced to m/2, which can effectively reduce the size and design difficulty of the display panel.

Figure 6B:
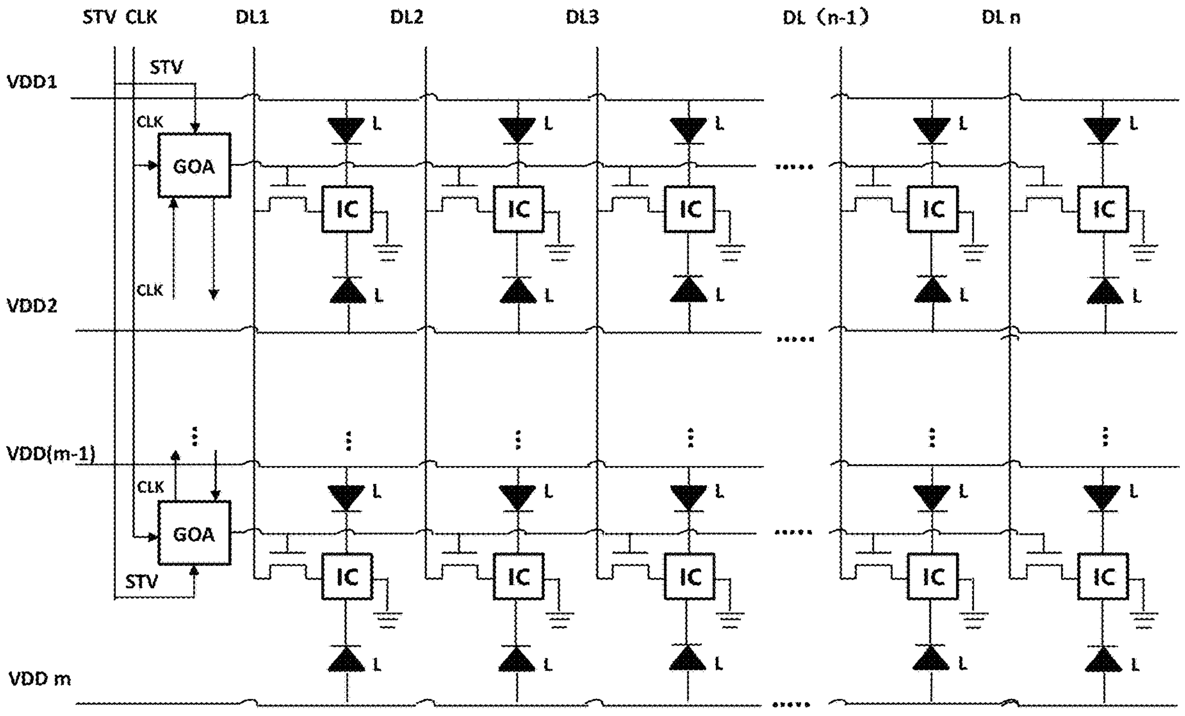
FIG. 6B is a schematic diagram of another example of another display panel provided by at least one embodiment of the present disclosure.

The structure of the display panel shown in FIG. 6B is similar to the of the display panel shown in FIG. 6A, except that: the light-emitting elements in the display panel shown in FIG. 6B adopt a common anode connection manner, the anodes of the two light-emitting elements connected to each pixel driving chip are connected to different voltage lines VDD, respectively. For specific introduction, please refer to the introduction in FIG. 5B, which will not be repeated here.

Transistors used in at least one embodiment of the present disclosure may be thin film transistors or field effect transistors or other switch elements with the same characteristics, in the embodiments described in the present disclosure, thin film transistors are used as an example for description. A source electrode and a drain electrode of the transistor used herein may be symmetrical in structure, so the source electrode and the drain electrode of the transistor may have no difference in structure. In the embodiments of the present disclosure, in order to distinguish two electrodes of the transistor apart from a gate electrode, one of the two electrodes is directly referred to as a first electrode, and the other of the two electrodes is referred to as a second electrode. In addition, the transistors may be classified into N-type transistors and P-type transistors according to the characteristics of the transistors. In the case where the transistor is a P-type transistor, the turn-on voltage is a low-level voltage, the turn-off voltage is a high-level voltage; when the transistor is an N-type transistor, the turn-on voltage is a high-level voltage, and the turn-off voltage is a low-level voltage.

In addition, the transistors in the embodiments of the present disclosure are described by taking N-type transistors as an example, in this case, the first electrode of the transistor is a drain electrode, and the second electrode is a source electrode. It should be noted that the present disclosure comprises but is not limited thereto. For example, one or more transistors in each selection switch provided by the embodiments of the present disclosure may also be P-type transistors, in this case, the first electrode of the transistor is a source electrode and the second electrode of the transistor is a drain electrode, so long as the respective electrodes of the selected type transistor are connected correspondingly with reference to the connection manner of the respective electrodes of the corresponding transistor in the embodiments of the present disclosure, and the corresponding voltage terminal is provided with a corresponding high voltage or low voltage. In a case where an N-type transistor is used, Indium Gallium Zinc Oxide (IGZO) can be adopted as an active layer of a thin film transistor, compared to adopt low temperature poly silicon (LTPS) or amorphous silicon (for example, hydrogenation amorphous silicon) as an active layer of a thin film transistor, the size of the transistor can be effectively reduced and the leakage current can be prevented.

Figure 13A:
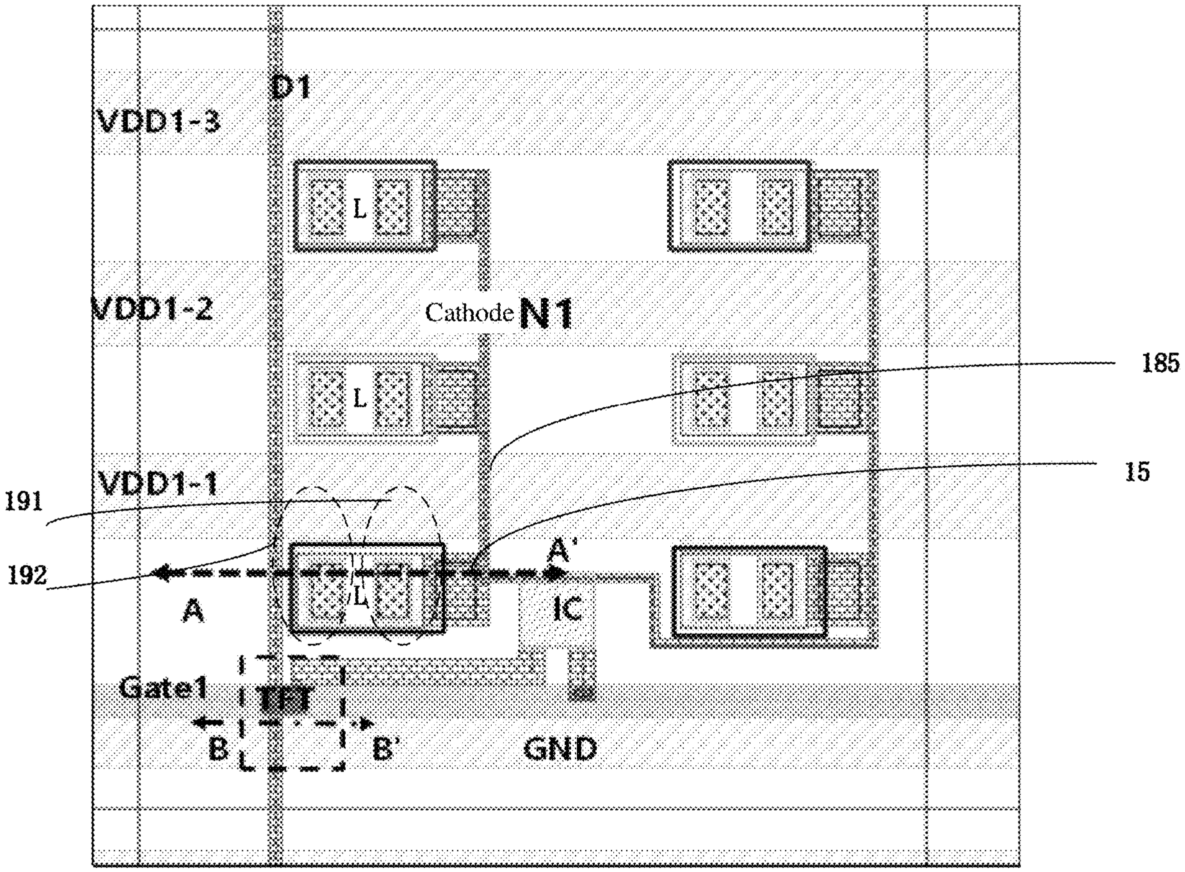
FIG. 13A is a schematic plane view of a display panel provided by at least one embodiment of the present disclosure.
Figure 13B:
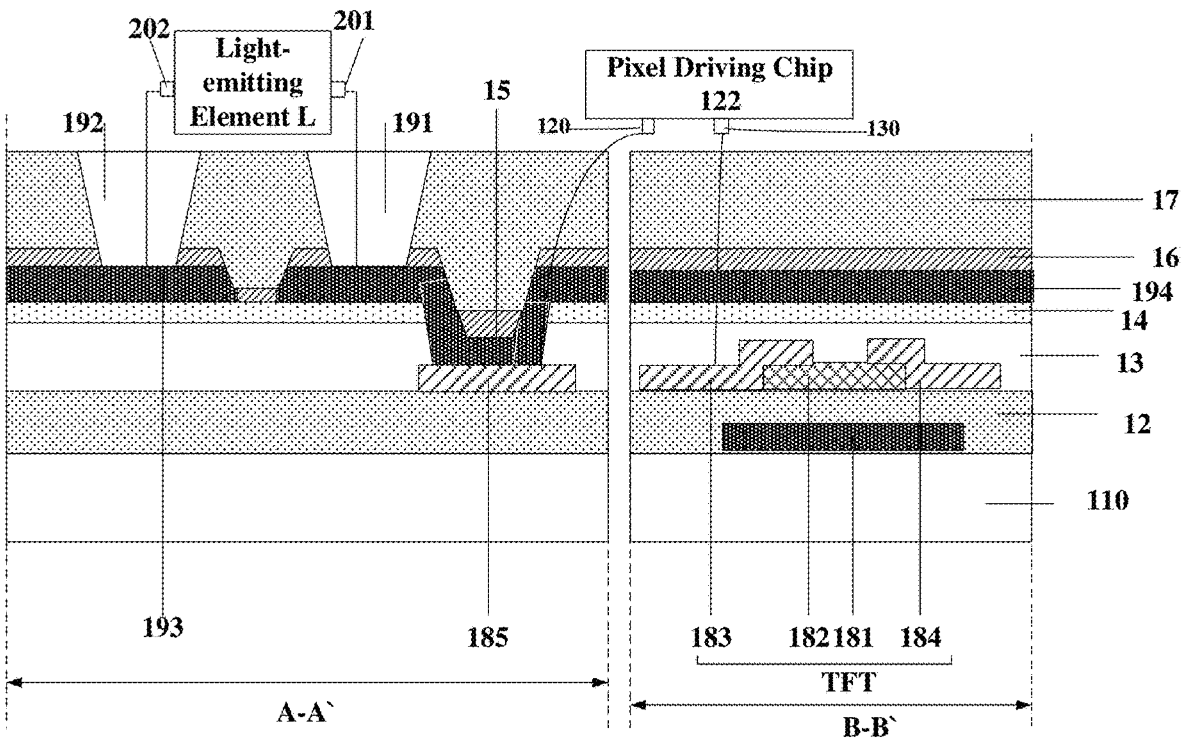
FIG. 13B is a schematic cross-sectional view of a display panel provided by at least one embodiment of the present disclosure.

FIG. 13A is a schematic plane view of a display panel provided by at least one embodiment of the present disclosure. FIG. 13A is a schematic plane view of the circuit diagram shown in FIG. 3A only comprising three light-emitting elements. FIG. 13B is a cross-sectional view of a display panel provided by at least one embodiment of the present disclosure. That is, FIG. 13B is a schematic cross-sectional view at the section lines A-A' and B-B' shown in FIG. 13A.

As shown in FIG. 13A, the cathodes of the three light-emitting elements are connected to the second terminal of the pixel driving chip 122 through connection electrodes 185 to receive the driving currents, respectively.

As shown in FIG. 13B, the display panel includes a substrate 110, a gate electrode 181 of a data writing transistor TFT, a first insulating layer 12, an active layer 182 of the data writing transistor TFT, a first electrode 183 (for example, a source electrode) of the data writing transistor TFT, a second electrode 184 (for example, a drain electrode) of the data writing transistor TFT, a connection electrode 185 connected to the second terminal 120 of the pixel driving chip 122 and a wiring electrode 15, a second insulating layer 13, a first passivation layer 14, the wiring electrode 15 and the first voltage line 193, a second passivation layer 16, and a third insulating layer 17 are sequentially formed on the substrate 110.

For example, the materials used for the first electrode 183, the second electrode 184, and the gate electrode 181 of the data writing transistor TFT may include aluminum, aluminum alloy, copper, copper alloy, or any other suitable materials, and the embodiments of the present disclosure are not limited to this case.

It should be noted that the material of the active layer 182 of the data writing transistor TFT may include oxide semiconductor, organic semiconductor, or amorphous silicon, polysilicon, etc., for example, the oxide semiconductor includes a metal oxide semiconductor (such as indium gallium zinc oxide (IGZO)), the polysilicon includes low-temperature polysilicon or high-temperature polysilicon, etc., the embodiments of the present disclosure are not limited in this aspect.

For example, the material used for the first passivation layer 14, the second passivation layer 16, the first insulating layer 12, the second insulating layer 13, and the third insulating layer 17 may include inorganic insulating materials, such as SiNx, SiOx, SiNxOy, etc., organic insulating materials, such as organic resins, or other suitable materials, embodiments of the present disclosure are not limited in this aspect.

For example, the material used for the wiring electrode 15 and the second voltage line 193 may be aluminum, aluminum alloy, copper, copper alloy, or any other suitable materials, the embodiments of the present disclosure are not limited in this aspect.

For example, as shown in FIG. 13B, in the embodiments of the present disclosure, the wiring electrode 15 is arranged on the side of the data writing transistor TFT away from the substrate 110; and the second voltage line 193 is arranged in the same layer as the wiring electrode 15 and is connected to the second electrode 202 of the light-emitting element L. For example, the at least one light-emitting element L and the pixel driving chip 122 are bound on the side of the wiring electrode 15 away from the substrate 110, and the first electrode 201 of the at least one light-emitting element L is connected to the second terminal 120 of the pixel driving chip 122 through the wiring electrode 15.

For example, in conjunction with the display panel shown in FIG. 13B and the display panel as shown in FIG. 3B, the wiring electrode 15 is a wiring connecting the pixel driving chip and the first electrodes (for example, the cathodes in the example shown in FIG. 3B) of the light-emitting elements L1-LQ, the wiring electrode 15 crosses (for example, is perpendicular to) the second voltage lines VDD1-1 to VDD2-Q connected to the second electrodes of the light-emitting elements L1-LQ and is arranged in the same layer as the second voltage lines VDD1-1 to VDD2-Q, in this example, the wiring electrode 15 receives a cathode signal from the pixel driving chip 122 and applies the cathode signal to the first electrode of the light-emitting element L to drive the light-emitting element L to emit light. For example, in the case where a plurality of light-emitting elements are included, each light-emitting element is attached to a place adjacent to the second voltage line connected to the second electrode of the light-emitting element, therefore, in order to prevent the second voltage line 193 connected to the second electrode of the light-emitting element from overlapping with the wiring electrode 15 connected to the first electrode of the light-emitting element to cause signal crosstalk, the connection electrode 185, that is located in a layer different from that of the wiring electrode, is provided to connect a plurality of wiring electrodes, that are configured to connect the first electrodes of the respective light-emitting elements L1-LQ and the second terminal 120 of the pixel driving chip, to receive the current that is output by the pixel driving chip and drives the light-emitting element to emit light. For example, the first electrode 201 of the light-emitting element L is connected to the wiring electrode 15 through a hole 191, for example, the wiring electrode 15 is connected to the connection electrode 185 through a hole in the first passivation layer 14 and the second insulating layer 13. For example, the connection electrode 185 is provided in the same layer as the first electrode 183 and the second electrode 184 of the thin film transistor TFT. For example, the material of the connection electrode 185 may be aluminum, aluminum alloy, copper, copper alloy, or any other suitable material, the embodiments of the present disclosure are not limited in this aspect.

For example, the display panel 100 further includes a light shielding layer 194, the light shielding layer 194 is arranged in the same layer as the wiring electrode 15, and an orthographic projection of the thin film transistor TFT on the substrate falls within an orthographic projection of the light shielding layer 194 on the substrate 110, so that the light shielding layer 194 can shield the thin film transistor TFT from light, so as to prevent the thin film transistor TFT from generating a leakage current due to an increase in charge carrier under the light. For example, the material of the light shielding layer 194 may be aluminum, aluminum alloy, copper, copper alloy or any other suitable material, the embodiments of the present disclosure are not limited in this aspect.

For example, in the example shown in FIG. 3A, the second voltage line can also be VSS1-1 to VSS2-Q providing the low voltage, the first electrode of the light-emitting element is the anode, and the second electrode of the light-emitting element is the cathode, in this case, the wiring electrode 15 receives the anode signal from the pixel driving chip 122 and applies the anode signal to the first electrode of the light-emitting element to drive the light-emitting element to emit light, the embodiments of the present disclosure are not limited to this case. The structure of the display panel in the other embodiments is similar to this structure, and will not be repeated here.

For example, in this example, both the light-emitting element L and the pixel driving chip 122 are bound on the substrate. For example, the pixel driving chip 122 is connected to the connection electrode 15 and the first electrode 183 of the data writing transistor TFT through a lead wire connected to a pin (not shown in the figure).

In the embodiments of the present disclosure, the second voltage line, that provides the second voltage to the light-emitting element, and the wiring electrode, that provides the current signal to the first electrode of the light-emitting element, are located on the same layer, which can avoid disposing the double Cu wire layers connected to the cathode and anode of the light-emitting element, only a single Cu wire layer is used to provide corresponding signals to the cathode and anode of the light-emitting element, thereby simplifying the process of the display panel, reducing the cost of the display panel, and improving the display resolution of the display panel.

At least one embodiment of the present disclosure also provides a display device. FIG. 7 is a schematic diagram of a display device provided by at least one embodiment of the present disclosure. For example, as shown in FIG. 7, the display device 10 includes, for example, the display panel 100 shown in any one of FIGS. 2A, 3A, 4, 5A, and 6A, and may also include the display panel 100 shown in any one of FIGS. 2C, 3B, 5B, and 6B. The embodiments of the present disclosure are not limited to this case.

For example, as shown in FIG. 7, in some examples, the display device 10 further includes a timing controller 200 configured to provide a clock signal to the voltage control circuit 140 in the display panel, so that the voltage control circuit 140 controls the timing sequence of sending the second voltage to each second voltage line according to the clock signal, so as to achieve the display of the display panel.

For example, the display device 10 may be a Mini LED display device or a miniature light-emitting diode display device, and the embodiments of the present disclosure are not limited to this case.

Figure 14A:
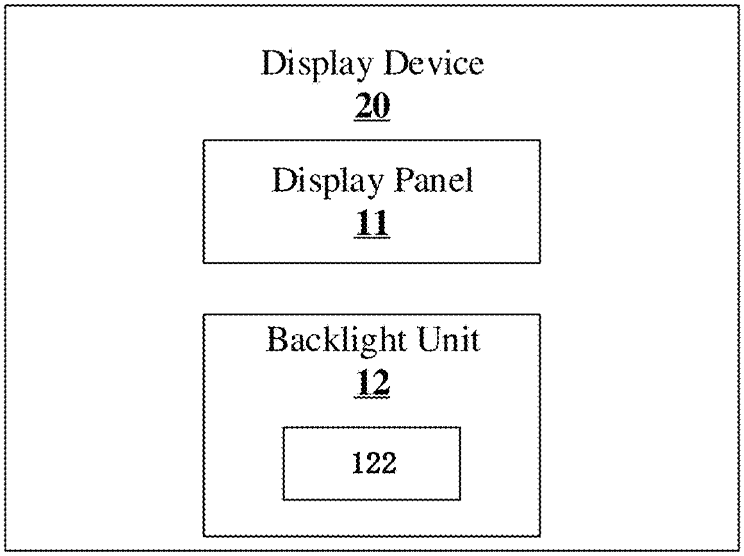
FIG. 14A is a schematic diagram of another display device provided by at least one embodiment of the present disclosure.
Figure 14B:
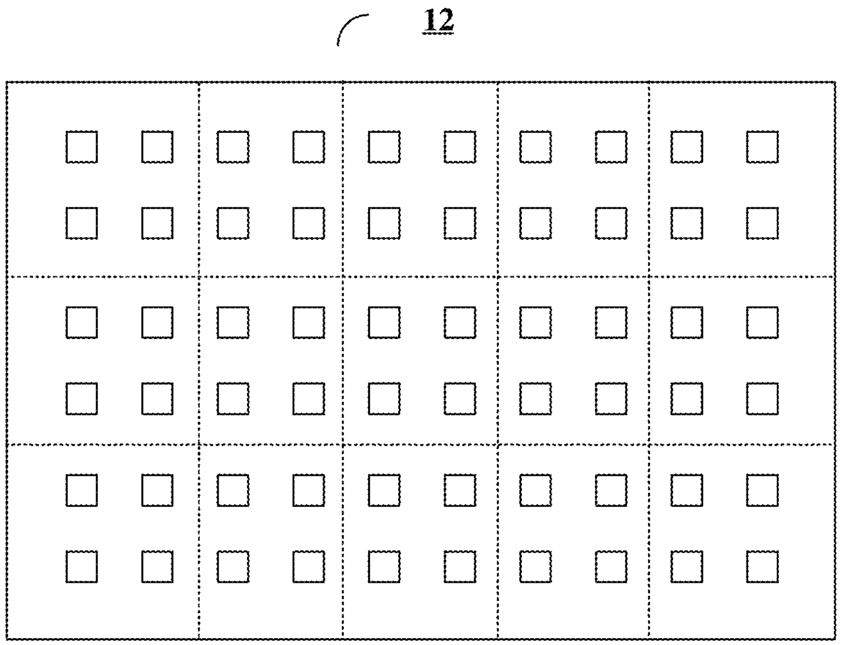
FIG. 14B is a schematic diagram of backlight partitions provided by at least one embodiment of the present disclosure.

At least one embodiment of the present disclosure also provides a display device. As shown in FIG. 14A, the display device 20 includes a display panel 11 and a backlight unit 12. For example, the backlight unit 12 includes a plurality of backlight partitions (partitions divided by dashed frames in FIG. 14B) and is driven by a local dimming method, and at least one of the plurality of backlight partitions includes a pixel driving chip 122 and a light-emitting element L. For example, the pixel driving chip 122 is configured to receive and store a data signal and drive at least one light-emitting element to emit light according to the data signal.

For example, the plurality of backlight partitions may be arranged in an array or not in an array, the embodiments of the present disclosure are not limited in this aspect. For example, in this example, each pixel driving chip is configured to drive the light-emitting elements in each backlight partition to emit light. The embodiments of the present disclosure are not limited to this case.

For example, in this example, the display device 20 may be a liquid crystal display device, the embodiment of the present disclosure are not limited in this aspect.

It should be noted that, for the driving principle of the pixel driving chip provided in the embodiments of the present disclosure, reference may be made to the related introduction of the above-mentioned embodiment, and details are not described herein again.

It should be noted that, for the sake of clarity and conciseness, the embodiments of the present disclosure are not provided all the constituent units of the display device 10 and the display device 20. In order to achieve the basic functions of the display device 10 and the display device 20, those skilled in the art can provide and set other structures not shown according to specific needs, and the embodiments of the present disclosure are not limited to this case.

Regarding the technical effects of the display device provided by the above-mentioned embodiments, reference may be made to the technical effects of the display panel provided in the embodiments of the present disclosure, and similar portions will not be repeated here.

At least one embodiment of the present disclosure further provides a driving method for driving the display panel provided by any embodiment of the present disclosure.

Figure 8:
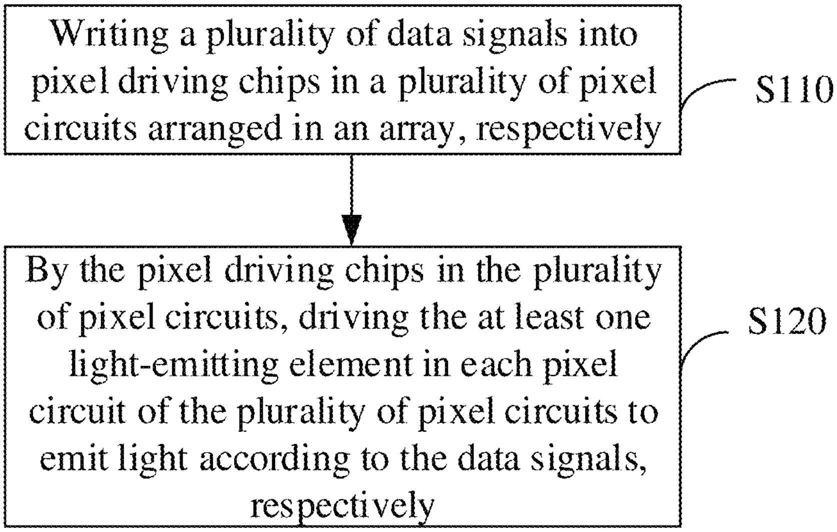
FIG. 8 is a flowchart of a driving method provided by at least one embodiment of the present disclosure.

FIG. 8 is a flowchart of a driving method provided by at least one embodiment of the present disclosure. FIGS. 9A-12A are signal timing diagrams of the display panels provided by different embodiments of the present disclosure, respectively. The driving method of the display panel provided by at least one embodiment of the present disclosure will be described in detail below with reference to FIGS. 8-12A. For example, as shown in FIG. 8, the driving method includes step S110 and step S120.

Step S110: writing a plurality of data signals into pixel driving chips in a plurality of pixel circuits arranged in an array, respectively.

Step S120: by the pixel driving chips in the plurality of pixel circuits, driving at least one light-emitting element in each pixel circuit of the plurality of pixel circuits to emit light according to the data signals, respectively.

Figure 9A:
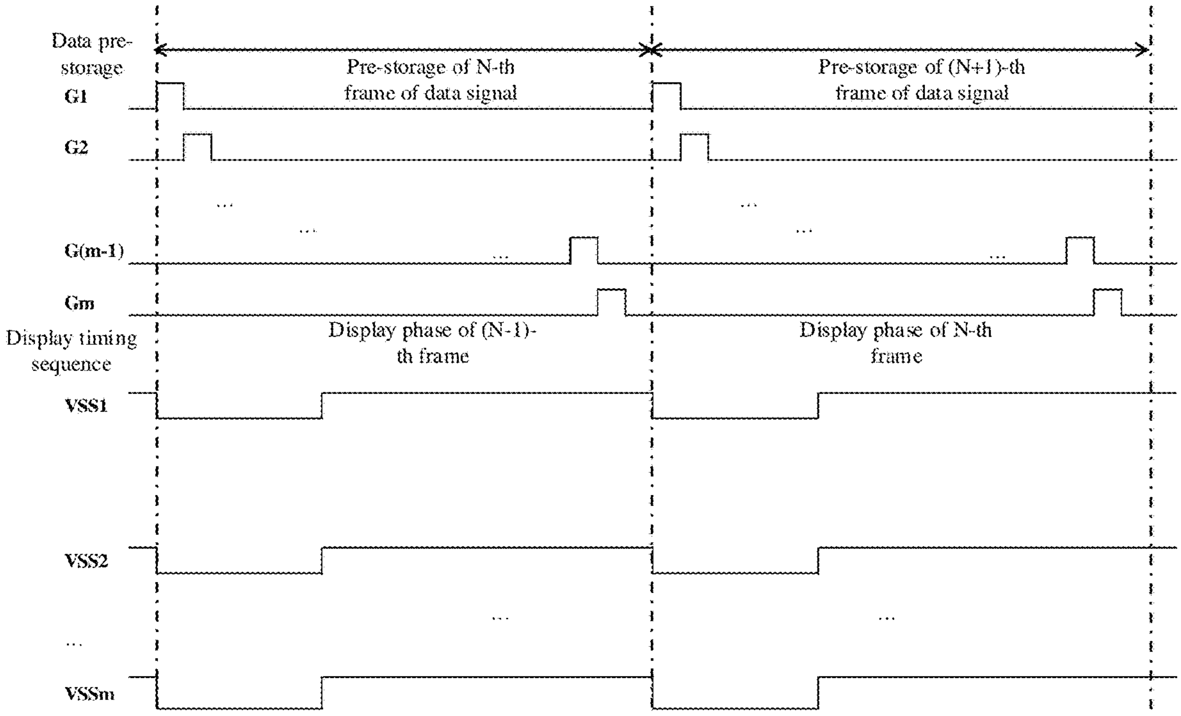
FIG. 9A is a signal timing diagram of a driving method of the display panel shown in FIG. 2A or FIG. 4.
Figure 10A:
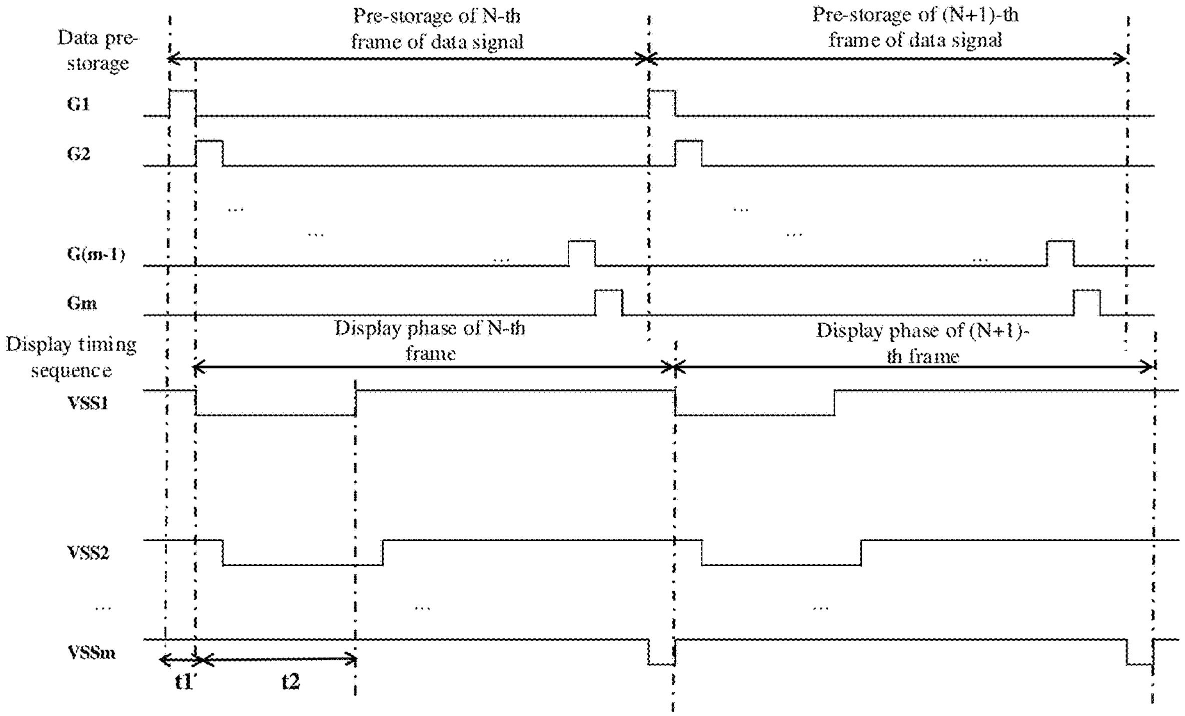
FIG. 10A is a signal timing diagram of another driving method of the display panel shown in FIG. 2A or FIG. 4.

For step S110, for example, as shown in FIG. 2A and FIG. 9A or FIG. 10A, the data writing transistors TFT in the plurality of pixel circuits 150 arranged in an array are turned on row by row in response to scan signals G1-Gm applied row by row, so that data signals provided by the data lines DL connected to the first electrodes of the data writing transistors TFT in respective rows are applied row by row to the pixel driving chips 122 in n columns through the data writing transistors TFT, which are turned on row by row, and stored in the pixel driving chips 122 for subsequent use of the display phase (or light-emitting phase).

For step S120, for example, the pixel driving chip 122 respectively applies a current to the at least one light-emitting element in each pixel circuit of the plurality of pixel circuits according to the data signal stored in step S110; applies a second voltage to the second electrode of the at least one light-emitting element in each pixel circuit of the plurality of pixel circuits, respectively, so that a path is formed between the first electrode and the second electrode of the at least one light-emitting element, therefore, the at least one light-emitting element in each pixel circuit of the plurality of pixel circuits can be driven to emit light.

FIG. 9A is a signal timing diagram of a driving method of the display panel shown in FIG. 2A or FIG. 4. In the example shown in FIG. 9A, each of the pixel driving chips includes at least one second terminal that is connected to the at least one light-emitting element in a one-to-one correspondence manner. For example, as shown in FIG. 2A, in the case where the pixel circuit 150 includes one light-emitting element, the pixel driving chip 122 includes a second terminal connected to the one light-emitting element; as shown in FIG. 4, in the case where the pixel circuit 150 includes Q light-emitting elements, the pixel driving chip 122 includes Q second terminals 120, which are connected to the Q light-emitting elements in a one-to-one correspondence manner. For example, in the examples shown in FIGS. 2A and 3A, the second electrodes of the light-emitting elements of pixel circuits in each row are connected to the same second voltage line to receive the second voltage.

As shown in FIG. 9A, in this example, the driving method includes: in a display phase of a (N−1)-th frame of image, storing a plurality of data signals corresponding to an N-th frame of image in the pixel driving chips of the plurality of pixel circuits, respectively. The pixel circuits in each row store a plurality of data signals row by row into the corresponding pixel driving chips in response to the scan signals G1, G2, . . . , G(m−1), and Gm provided row by row as shown in FIG. 9 in step S110. In this case, the light-emitting element L does not emit light until the data signals corresponding to the light-emitting elements of the entire display panel are stored. When entering the display phase of the N-th frame of image, the corresponding second voltage line VSS provides the second voltage to the second electrode of the light-emitting element, the corresponding light-emitting element emits light, and the pre-stored image data is displayed.

In a display phase of the N-th frame of image, second voltages are applied to second electrodes of light-emitting elements of pixel circuits in each row, respectively, currents are applied to the first electrodes of light-emitting elements electrically connected to the plurality of pixel driving chips, respectively, according to the plurality of data signals stored in the pixel driving chips, so as to drive the light-emitting elements of pixel circuits in each row to emit light; N is an integer greater than 1.

For example, in this example, because the data signal corresponding to each light-emitting element is provided through the second terminal of the pixel driving chip connected to the light-emitting element, therefore, the second voltage can be provided to the light-emitting elements of pixel circuits in each row at the same time to drive the light-emitting elements of pixel circuits in each row to emit light at the same time, so that the number of scan times of the display panel can be reduced, and the power consumption of the display panel can be reduced.

FIG. 10A is a signal timing diagram of another driving method of the display panel shown in FIG. 2A or FIG. 4. The embodiment shown in FIG. 10A is similar to the embodiment shown in FIG. 9A, except that: the driving method shown in FIG. 9A stores all the data signals corresponding to the display image of the current frame in the display phase of the previous frame of image, and displays all the data signals corresponding to the display image of the current frame in the case where the current frame is displayed; while in the driving method shown in FIG. 10A, after the pixel circuits in one row have prestored corresponding data signals, the second voltage line corresponding to the pixel circuits in one row provides a second voltage to the second electrodes of the light-emitting elements included in the pixel circuits in one row, therefore, the light-emitting elements emit light row by row and display the pre-stored image data, that is, in the display phase of the current frame of image, the data signals are stored row by row and displayed row by row. This kind of work sequence can reduce display delay.

For example, in a first phase t1, a gate line of a first row provides a scan signal G1, and the switch transistors TFT in the pixel circuits are turned on to write the data signals into the pixel driving chips of the pixel circuits in the first row.

In a second phase t2, a first one VSS1 of the second voltage lines connected to the second electrodes of the light-emitting elements of the pixel circuits in the first row provides a second voltage, and therefore, the light-emitting elements of the pixel circuits in the first row emit light.

Next, a gate line of a second row provides a scan signal G2, and the second voltage line VSS2 connected to the second electrodes of the light-emitting elements of the pixel circuits in the second row provides the second voltage. Therefore, the light-emitting elements of the pixel circuits in the second row emit light, and so on.

Figure 9B:
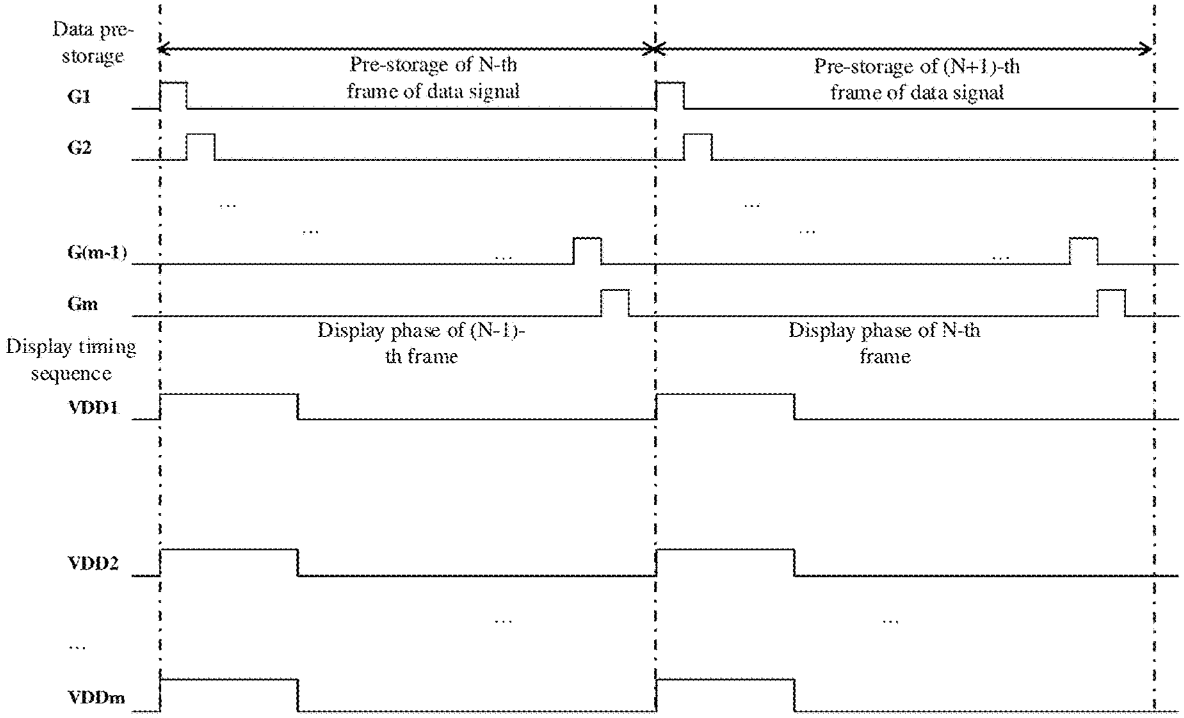
FIG. 9B is a signal timing diagram of a driving method of the display panel shown in FIG. 2C.

FIG. 9B is a schematic diagram of a driving method of the display panel shown in FIG. 2C. The driving method shown in FIG. 9B is similar to the driving method shown in FIG. 9A, except that: when entering the display phase of the N-th frame, the corresponding second voltage line VDD provides a second voltage to the second electrode of the light-emitting element (for example, the anode in this example), the corresponding light-emitting element emits light, and the pre-stored image data is displayed. For the remaining portions, please refer to the description of FIG. 9A, which will not be repeated here.

Figure 10B:
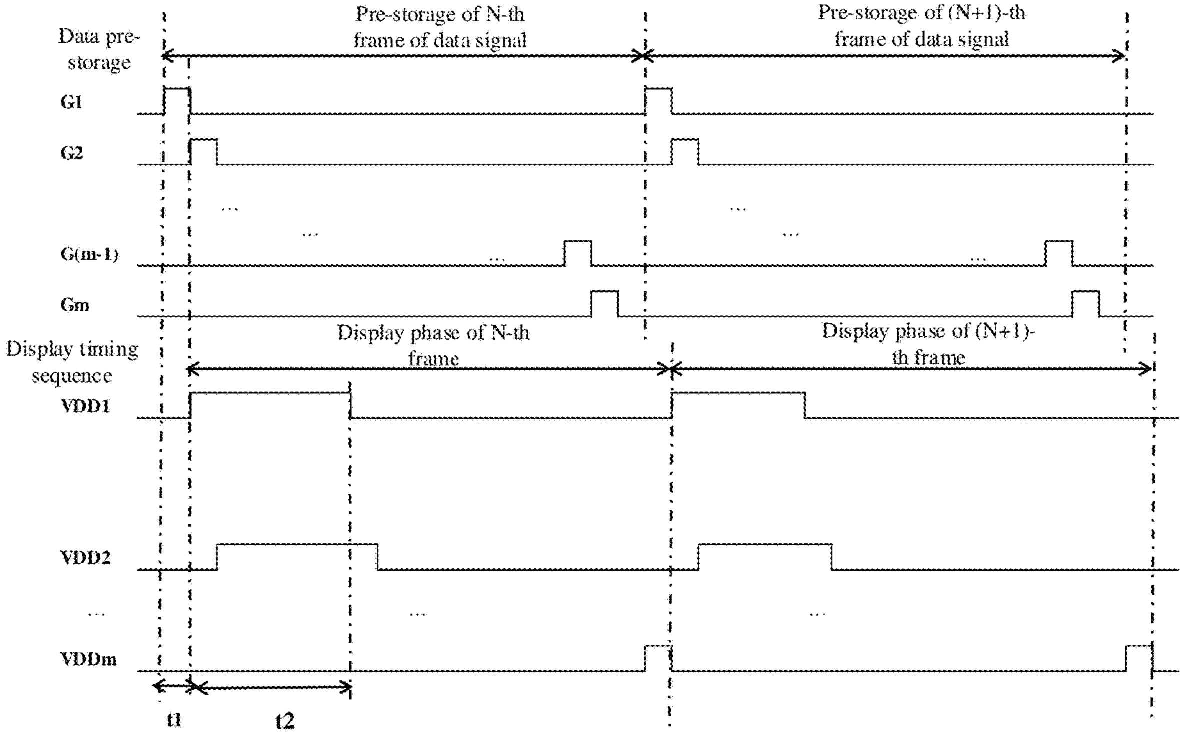
FIG. 10B is a signal timing diagram of another driving method of the display panel shown in FIG. 2C.

For example, the display panel shown in FIG. 2C can also be driven using the timing sequence as shown in FIG. 10B. For example, as shown in FIG. 10B, in the first phase t1, the gate line of the first row provides the scan signal G1, the switch transistors TFT in the pixel circuits are turned on to write the data signals into the pixel driving chips of the pixel circuits in the first row. In the second phase t2, the first second voltage line VDD1 connected to the anodes of the light-emitting elements of the pixel circuits in the first row provides the second voltage, and therefore, the light-emitting elements of the pixel circuits in the first row emit light.

Next, the gate line in the second row provides the scan signal G2, and the second voltage line VDD2 connected to the second electrodes of the light-emitting elements of the pixel circuits in the second row provides the second voltage, therefore, the light-emitting elements of pixel circuits in the second row emit light, and so on. For the related description of the timing sequence as shown in FIG. 10B, reference may be made to the related introduction of the timing sequence as shown in FIG. 10A, and similar portions will not be repeated here.

Figure 11A:
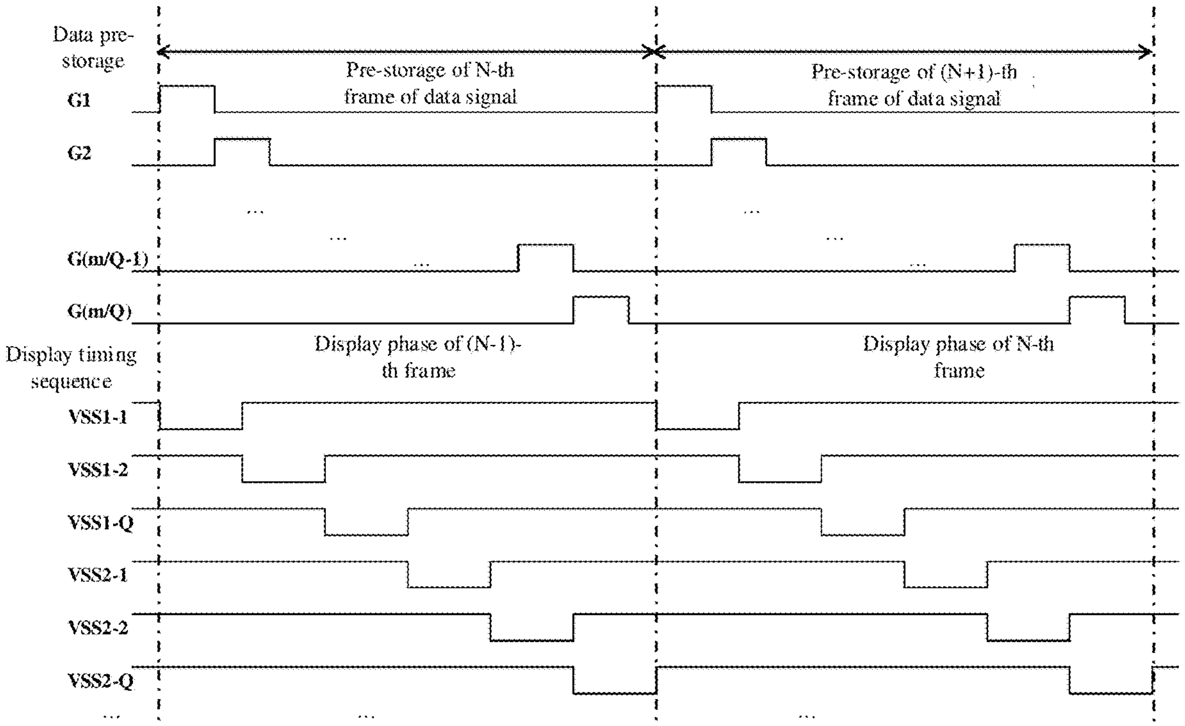
FIG. 11A is a signal timing diagram of a driving method of the display panel shown in FIG. 3A and the display panel shown in FIG. 5A.

FIG. 11A is a signal timing diagram of a driving method of the display panel shown in FIG. 3A and the display panel shown in FIG. 5A. For example, in this example, at least one light-emitting element includes a plurality of light-emitting elements, and each of the pixel circuits includes a plurality of light-emitting elements electrically connected to the pixel driving chip. For example, in this example, according to a plurality of data signals, corresponding currents are sequentially applied to a plurality of light-emitting elements electrically connected to the pixel driving chips in each row, respectively; the second voltages are applied row by row to the second electrodes of the plurality of light-emitting elements electrically connected to the pixel driving chips in each row according to the timing sequence for applying the currents to the plurality of light-emitting elements, so as to drive the plurality of light-emitting elements to emit light in a time-sharing manner.

For example, as shown in FIG. 3A, in the case where the pixel circuit 150 includes Q light-emitting elements, the pixel driving chip 122 includes a second terminal connected to the first electrodes of the Q light-emitting elements; as shown in FIG. 4, in the case where the pixel circuit 150 includes Q light-emitting elements, the pixel driving chip 122 includes Q second terminals 120, which are connected to the Q light-emitting elements in a one-to-one correspondence manner. For example, in the examples shown in FIG. 2A and FIG. 3A, only two groups of second voltage lines are schematically shown to correspondingly connect to the two rows of pixel circuits shown in FIG. 3A or FIG. 5A. It should be noted that, for clarity and conciseness, a third group, a fourth group, to a m/Q-th group of second voltage lines included in the display panel are not shown, the specific settings can be determined according to actual conditions, the embodiments of the present disclosure are not limited to this case. For example, in this example, the number of wires (e.g., gate lines) of the display panel and the number of shift registers GOA can be reduced, which can effectively reduce the size and design difficulty of the display panel.

For example, as shown in FIGS. 3A and 5A, the plurality of light-emitting elements includes Q light-emitting elements L1-LQ, and each group of second voltage lines includes Q second voltage lines. For example, the q-th second voltage line of the Q second voltage lines is connected to the q-th light-emitting elements respectively electrically connected to the pixel driving chips in the pixel circuits of the corresponding row, and q is an integer greater than 0 and less than or equal to N. For example, a first light-emitting element L1 connected to a first pixel driving chip in the first row and a first light-emitting element L1 connected to a second pixel driving chip in the first row are both connected to a first one VSS1-1 of the second voltage lines of the first group, a second light-emitting element L1 connected to the first pixel driving chip in the first row and a second light-emitting element L1 connected to the second pixel driving chip in the first row are both connected to the second one VSS1-2 of the second voltage lines of the first group, and so on.

For example, in some examples, in a display phase of a (N−1)-th frame of image, a plurality of data signals corresponding to an N-th frame of image are stored in the pixel driving chips of the plurality of pixel circuits, respectively. The pixel circuits in each row store a plurality of data signals row by row into the corresponding pixel driving chips in response to the scan signals G1, G2, . . . , G(m/Q−1), and G(m/Q) provided row by row as shown in FIG. 11A in step S110. In this case, the light-emitting element L does not emit light until the data signals corresponding to the light-emitting elements of the entire display panel are stored. When entering the display phase of the N-th frame, the respective second voltage lines VSS provide the second voltages to the second electrodes of the light-emitting elements row by row, and the light-emitting elements emit light row by row, and the pre-stored image data is displayed.

Figure 11B:
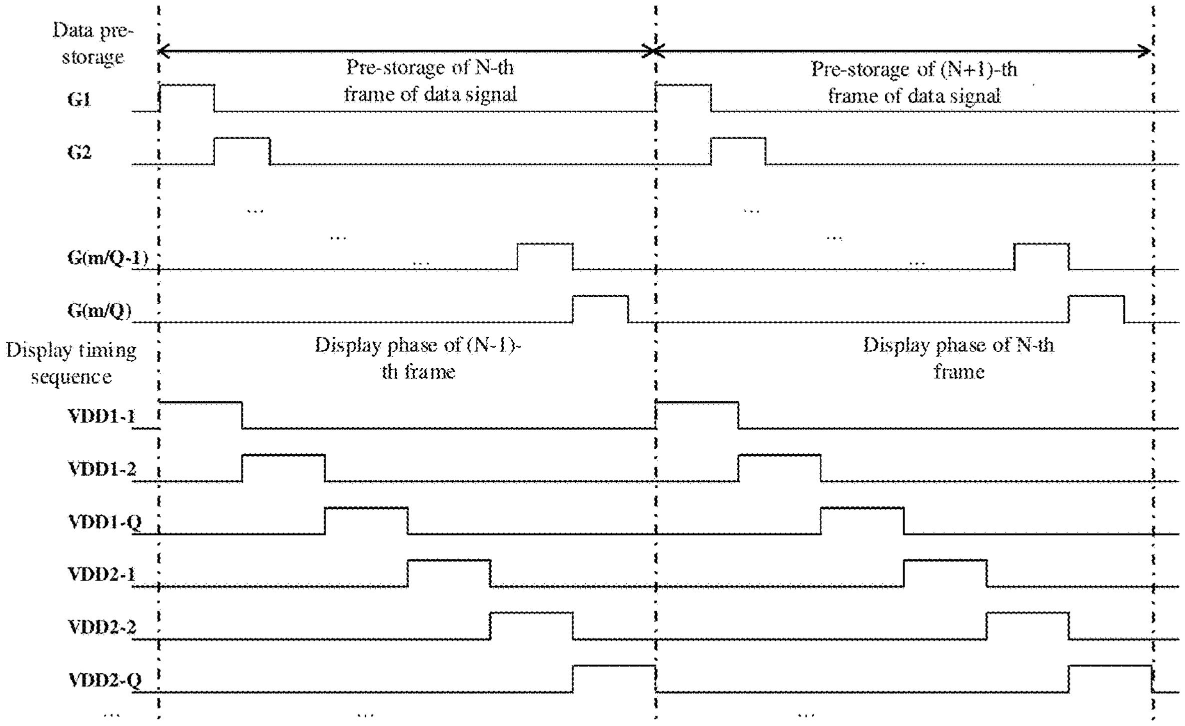
FIG. 11B is a signal timing diagram of another driving method of the display panel shown in FIG. 3B and the display panel shown in FIG. 5B.

FIG. 11B is a driving timing diagram of the display panel shown in FIG. 3B and the display panel shown in FIG. 5B. For example, in this example, the pixel circuits in each row store a plurality of data signals row by row into the corresponding pixel driving chips in response to the scan signals G1, G2, . . . , G(m/Q−1), and G(m/Q) provided row by row shown in FIG. 11B in step S110. In this case, the light-emitting element L does not emit light until the data signals corresponding to the light-emitting elements of the entire display panel are stored. When entering the display phase of the N-th frame, the respective second voltage lines VSS provide the second voltages to the second electrodes of the light-emitting elements row by row, and the light-emitting elements emit light row by row, and the pre-stored image data is displayed.

Figure 12A:
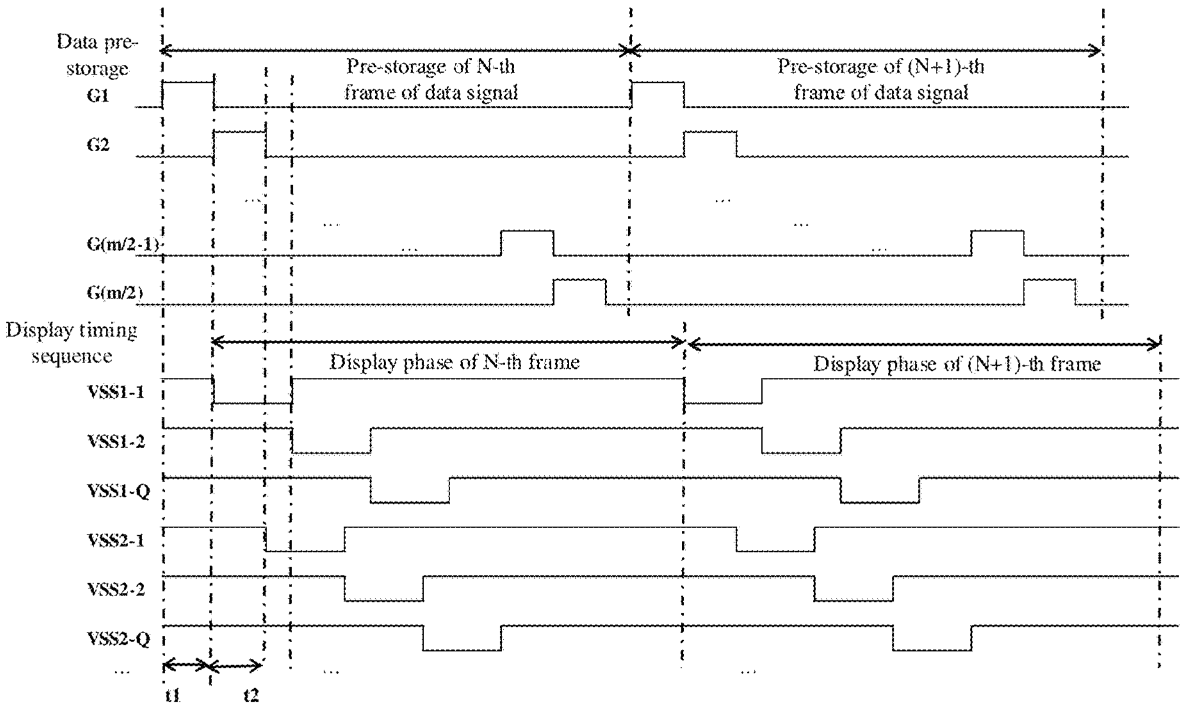
FIG. 12A is a signal timing diagram of another driving method of the display panel shown in FIG. 3A and the display panel shown in FIG. 5A.

FIG. 12A is a timing diagram of other driving method provided by at least one embodiment of the present disclosure. The embodiment shown in FIG. 12A is similar to the embodiment shown in FIG. 10A, except that: in the second phase t2 in FIG. 12A, the Q second voltage lines in the first group of second voltage lines are driven row by row. For details, reference may be made to the description in FIG. 10A, and similar portions will not be repeated here.

Figure 12B:
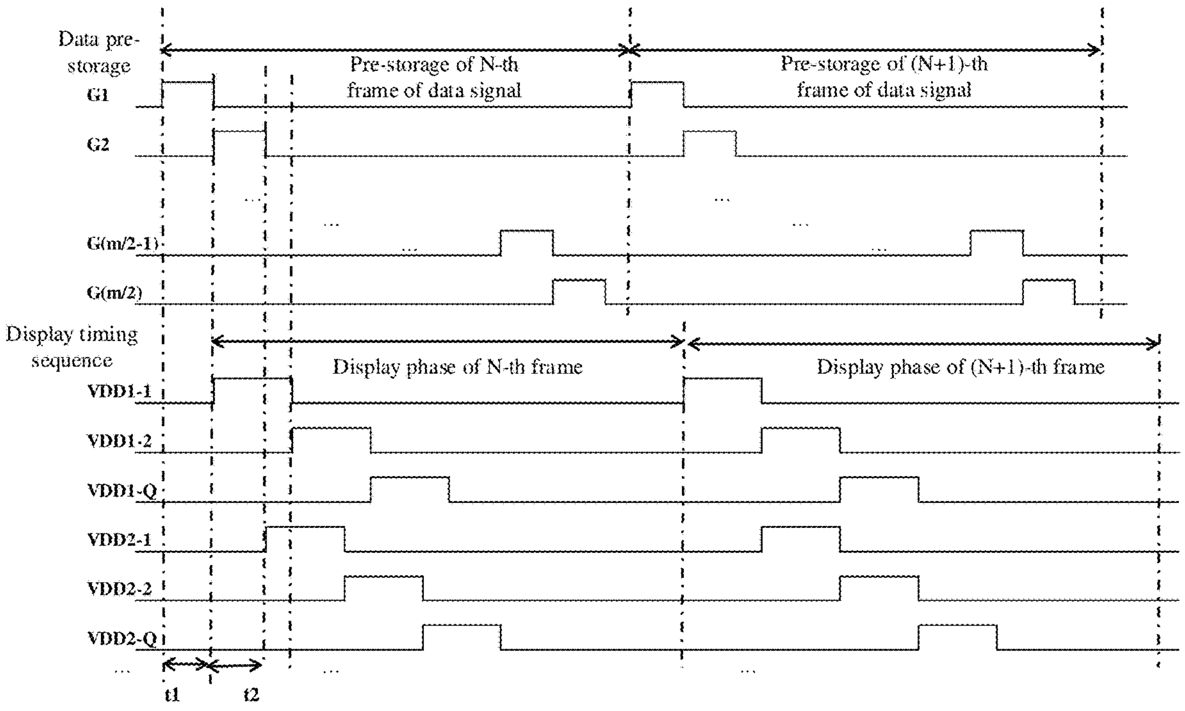
FIG. 12B is a signal timing diagram of another driving method of the display panel shown in FIG. 3B and the display panel shown in FIG. 5B.

FIG. 12B is another driving timing diagram of the display panel shown in FIG. 3B and the display panel shown in FIG. 5B. The example shown in FIG. 12B is similar to the example shown in FIG. 12A, except that: the second voltage VDD is applied to the anodes of the light-emitting elements L row by row to drive the light-emitting elements in the respective rows to emit light row by row. Similar portions will not be repeated here.

Figure 12C:
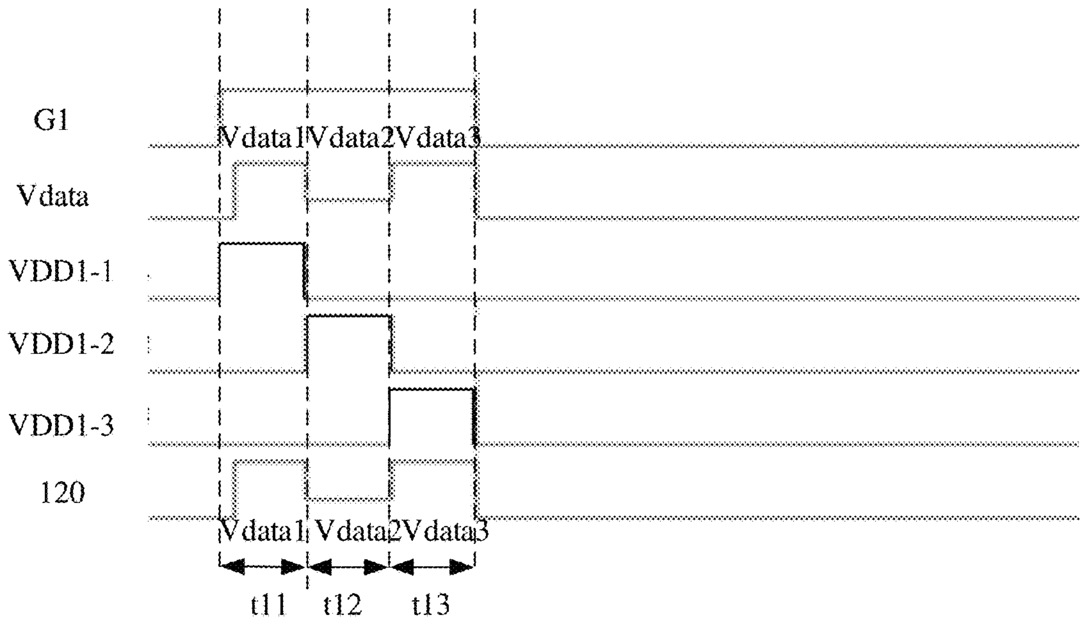
FIG. 12C is a signal timing diagram of another driving method of a display panel provided by at least one embodiment of the present disclosure.

FIG. 12C is another driving timing diagram of the display panel shown in FIG. 3B and the display panel shown in FIG. 5B. As shown in FIG. 12C, in some other examples, Q=3 is taken as an example for introduction, that is, in the case where the pixel driving IC in FIG. 3B drives three light-emitting elements L, in the case where the gate line G1 of the first row provides the gate scan signal, the data writing transistors TFT are turned on, and the data signals Vdata1-Vdata3 provided by the first data line DL1 are written into the pixel driving chip 122, and the data signals Vdata1-Vdata3 are provided to the cathodes of the light-emitting elements L1-LQ (Q=3) through the second terminal 120 of the pixel driving chip 122, respectively. For example, the data signal Vdata1 is the display data for the first light-emitting element L1 to emit light, the data signal Vdata2 is the display data for the second light-emitting element L2 to emit light, and the data signal Vdata3 is the display data for the third light-emitting element L3 to emit light.

In the first light-emitting phase t11, in the case where the data signal Vdata1 is written into the cathodes of the first light-emitting element L1 to the third light-emitting element L3, a second voltage is provided on the second voltage line VDD1-1 connected to the second electrode of the first light-emitting element L1, so that the first light-emitting element L1 forms a path, so that the pixel driving chip 120 applies the driving current generated based on the data signal Vdata1 to the first light-emitting element L1 to drive the first light-emitting element L1 to emit light. In this case, because the second voltage lines connected to the second electrode of the second light-emitting element L2 and the second electrode of the third light-emitting element L3, respectively, do not provide the second voltage, the second light-emitting element L2 and the third light-emitting element L3 do not emit light.

In the second light-emitting phase t12, in the case where the data signal Vdata2 is written into the cathodes of the first light-emitting element L1 to the third light-emitting element L3, a second voltage is provided on the second voltage line VDD1-2 connected to the second electrode of the second light-emitting element L2, so that the second light-emitting element L2 forms a path, so that the pixel driving chip 120 applies the driving current generated based on the data signal Vdata2 to the second light-emitting element L2 to drive the second light-emitting element L2 to emit light. In this case, because the second voltage lines connected to the second electrode of the first light-emitting element L1 and the second electrode of the third light-emitting element L3, respectively, do not provide the second voltage, the first light-emitting element L1 and the third light-emitting element L3 do not emit light.

In the third light-emitting phase t13, in the case where the data signal Vdata3 is written into the cathodes of the first light-emitting element L1 to the third light-emitting element L3, a second voltage is provided on the second voltage line VDD1-3 connected to the second electrode of the third light-emitting element L3, so that the third light-emitting element L3 forms a path, so that the pixel driving chip 120 applies the driving current generated based on the data signal Vdata3 to the third light-emitting element L3 to drive the third light-emitting element L3 to emit light. In this case, because the second voltage lines connected to the second electrode of the first light-emitting element L1 and the second electrode of the second light-emitting element L2, respectively, do not provide the second voltage, the first light-emitting element L1 and the second light-emitting element L2 do not emit light.

It should be noted that the driving methods of the other rows of light-emitting elements are similar here, and will not be repeated here.

For example, in the embodiment of the present disclosure, for the example shown in FIG. 5A, respective groups of second voltage lines can simultaneously apply the second voltages to the second electrodes of the light-emitting elements, that is, for example, the driving methods shown in FIG. 4 and FIG. 9A, and the embodiments of the present disclosure are not limited to this case.

It should be noted that in the plurality of embodiments of the present disclosure, the flow of the driving method may include more or fewer operations, and these operations may be executed sequentially or in parallel. The driving method described above may be executed once, or may be executed several times according to predetermined conditions.

Regarding the technical effects of the driving method provided in the above-mentioned embodiments, reference may be made to the technical effects of the display panel provided in the embodiments of the present disclosure, and similar portions will not be repeated here.

The following should be noted:

(1) Only the structures involved in the embodiments of the present disclosure are illustrated in the drawings of the embodiments of the present disclosure, and other structures can refer to usual designs.

(2) The embodiments and features in the embodiments of the present disclosure may be combined in case of no conflict to acquire new embodiments.

What have been described above merely are exemplary embodiments of the present disclosure, and not intended to define the scope of the present disclosure, and the scope of the present disclosure is determined by the appended claims.

What is claimed is:

1. A display panel, comprising:

a substrate and a plurality of pixel circuits arranged in an array on the substrate, wherein each of the plurality of pixel circuits comprises a pixel driving chip and at least one light-emitting element electrically connected to the pixel driving chip, and the pixel driving chip is configured to receive and store a data signal and drive the at least one light-emitting element to emit light according to the data signal;

each of the at least one light-emitting element comprises a first electrode and a second electrode;

the pixel driving chip comprises a first terminal, a second terminal, and a third terminal, and is configured to control a current flowing through the at least one light-emitting element according to the data signal;

the first terminal of the pixel driving chip is connected to a first voltage terminal to receive a first voltage, and the second terminal of the pixel driving chip is connected to the first electrode of the at least one light-emitting element;

the pixel circuit comprises a data writing circuit, and the data writing circuit is connected to the pixel driving chip and configured to write the data signal to the pixel driving chip in response to a scan signal;

the data writing circuit comprises a data writing transistor;

a gate electrode of the data writing transistor is electrically connected to a gate driving circuit through a gate line connected to the data writing transistor to receive the scan signal, a first electrode of the data writing transistor is electrically connected to a data driving circuit through a data line connected to the data writing transistor to receive the data signal, and a second electrode of the data writing transistor is electrically connected to the third terminal of the pixel driving chip;

the display panel further comprises:

a wiring electrode, on a side of the data writing transistor away from the substrate; and a second voltage line, in a same layer as the wiring electrode, and connected to the second electrode of the at least one light-emitting element to provide a second voltage, wherein the at least one light-emitting element and the pixel driving chip are bound on a side of the wiring electrode away from the substrate, and the first electrode of the at least one light-emitting element is connected to the second terminal of the pixel driving chip through the wiring electrode.

2. The display panel according to claim 1, further comprising: the gate driving circuit, a plurality of gate lines, the data driving circuit, and a plurality of data lines, which are on the substrate, the gate driving circuit is electrically connected to data writing circuits of a plurality of rows of pixel circuits through the plurality of gate lines, respectively, and is configured to provide a plurality of scan signals to the data writing circuits of the plurality of rows of pixel circuits, respectively; and the data driving circuit is electrically connected to data writing circuits of a plurality of columns of pixel circuits through the plurality of data lines, respectively, and is configured to provide a plurality of data signals to the data writing circuits of the plurality of columns of pixel circuits, respectively.

3. The display panel according to claim 1, wherein the pixel driving chip comprises one second terminal, and the second terminal is electrically connected to the first electrode of the at least one light-emitting element, or, the at least one light-emitting element comprises a plurality of light-emitting elements, the pixel driving chip comprises a plurality of second terminals, and the plurality of second terminals are electrically connected to first electrodes of the plurality of light-emitting elements in a one-to-one correspondence manner.

4. The display panel according to claim 3, wherein second electrodes of light-emitting elements of pixel circuits in each row are connected to a same second voltage line to receive the second voltage.

5. The display panel according to claim 3, wherein a plurality of second voltage lines comprise a plurality of groups of second voltage lines, wherein the plurality of groups of second voltage lines are connected to a plurality of rows of pixel circuits in a one-to-one correspondence manner; and the plurality of light-emitting elements comprise Q light-emitting elements, each group of second voltage lines comprises Q second voltage lines, and a q-th second voltage line of the Q second voltage lines is connected to q-th light-emitting elements respectively electrically connected to respective pixel driving chips of pixel circuits in a corresponding row, wherein q is an integer greater than 0 and less than or equal to Q, and Q is an integer greater than or equal to 1.

6. The display panel according to claim 5, wherein a voltage control circuit is connected to the plurality of groups of second voltage lines, and is configured to simultaneously or sequentially apply second voltages to the Q second voltage lines in each group of second voltage lines according to a timing sequence of applying currents, which correspond to corresponding data signals, to the Q light-emitting elements, which are connected to the respective pixel driving chips, by the respective pixel driving chips, to drive the Q light-emitting elements to simultaneously or sequentially emit light according to the corresponding data signals.

7. The display panel according to claim 1, wherein the at least one light-emitting element comprises at least two light-emitting elements, and the at least two light-emitting elements emit light of different colors.

8. The display panel according to claim 1, wherein the at least one light-emitting element is a sub-millimeter light-emitting diode or a miniature light-emitting diode.

9. The display panel according to claim 1, further comprising: a connection electrode, wherein the connection electrode is connected to the wiring electrode through a hole, and the connection electrode is in a same layer as the first electrode and the second electrode of the data writing transistor.

10. The display panel according to claim 1, further comprising: a light shielding layer, wherein the light shielding layer and the wiring electrode are arranged in a same layer, and an orthographic projection of the light shielding layer on the substrate coincides with an orthographic projection of a thin film transistor on the substrate.

11. The display panel according to claim 1, wherein the display panel further comprises a plurality of second voltage lines that are connected to a plurality rows of pixel circuits in a one-to-one correspondence manner, and the second electrode of the light-emitting element of each row of pixel circuits is connected to a corresponding second voltage line;

the display panel is configured to, in a display phase of a (N−1)-th frame of image, store a plurality of data signals which correspond to a N-th frame of image in pixel driving chips of the plurality of pixel circuits, respectively; and the display panel further comprises a voltage control circuit, the voltage control circuit is connected to the plurality of second voltage lines, and is configured to, after the data signals corresponding to light-emitting elements in all of the plurality of rows of pixel circuits of an entirety of the display panel are stored, simultaneously directly apply second voltages to second electrodes of the light-emitting elements of pixel circuits in the plurality of rows of pixel circuits through the plurality of the second voltage lines, so as to drive the light-emitting elements of pixel circuits in all of the plurality of rows of pixel circuits to simultaneously emit light in a display phase of the N-th frame of image, wherein N is an integer greater than 1.

12. A display device, comprising the display panel according to claim 1.

13. A driving method of the display panel according to claim 1, comprising:

writing a plurality of data signals into pixel driving chips in the plurality of pixel circuits arranged in the array, respectively; and by the pixel driving chips in the plurality of pixel circuits, driving the at least one light-emitting element in each pixel circuit of the plurality of pixel circuits to emit light according to the data signals, respectively.

14. The driving method of the display panel according to claim 13, wherein by the pixel driving chips in the plurality of pixel circuits, driving the at least one light-emitting element in each pixel circuit of the plurality of pixel circuits to emit light according to the data signals, respectively, comprises:

applying second voltages to second electrodes of the at least one light-emitting element in each pixel circuit of the plurality of pixel circuits, respectively; and by the pixel driving chips, controlling currents flowing through the at least one light-emitting element in each pixel circuit of the plurality of pixel circuits according to the data signals, respectively, to drive the at least one light-emitting element in each pixel circuit of the plurality of pixel circuits to emit light.

15. The driving method of the display panel according to claim 14, wherein each of the pixel driving chips comprises at least one second terminal which is connected to the at least one light-emitting element in a one-to-one correspondence manner, and the driving method comprises:

in a display phase of a (N−1)-th frame of image, storing a plurality of data signals, which correspond to a N-th frame of image, in the pixel driving chips of the plurality of pixel circuits, respectively; and in a display phase of the N-th frame of image, applying second voltages to second electrodes of light-emitting elements of pixel circuits in respective rows, respectively controlling corresponding currents flowing through the at least one light-emitting element electrically connected to each of the pixel driving chips according to the plurality of data signals stored in the pixel driving chips, to drive the light-emitting elements of pixel circuits in the respective rows to emit light, wherein N is an integer greater than 1.

16. The driving method of the display panel according to claim 14, wherein each of the plurality of pixel circuits comprises at least one second terminal which is connected to the at least one light-emitting element in a one-to-one correspondence manner, and the driving method comprises:

storing the plurality of data signals corresponding to an N-th frame of image row by row in a display phase of the N-th frame of image; and applying second voltages to second electrodes of light-emitting elements in a plurality of rows of pixel circuits row by row to drive light-emitting elements in the plurality of rows of pixel circuits to emit light row by row according to the plurality of data signals that are stored, wherein N is an integer greater than 1.

17. The driving method of the display panel according to claim 14, wherein the at least one light-emitting element comprises a plurality of light-emitting elements, and the driving method comprises:

sequentially applying currents to a plurality of light-emitting elements, which are respectively electrically connected to each pixel driving chip of pixel driving chips of respective rows, according to the plurality of data signals; and according to a timing sequence at which the currents are applied to the plurality of light-emitting elements, applying second voltages row by row to second electrodes of the plurality of light-emitting elements, which are electrically connected to each pixel driving chip of the pixel driving chips of respective rows, to drive the plurality of light-emitting elements to emit light in a time-sharing manner.

* * * * *